(12) United States Patent
Scharf et al.

(10) Patent No.: US 9,507,932 B2
(45) Date of Patent: Nov. 29, 2016

(54) POLICY ENFORCEMENT IN A TOPOLOGY ABSTRACTION SYSTEM

(71) Applicants: Michael Scharf, Stuttgart (DE); Thomas Voith, Kornwestheim (DE); Manuel Stein, Stuttgart (DE); Yihao Zhang, Chatham, NJ (US); Gordon Wilfong, Florham Park, NJ (US)

(72) Inventors: Michael Scharf, Stuttgart (DE); Thomas Voith, Kornwestheim (DE); Manuel Stein, Stuttgart (DE); Yihao Zhang, Chatham, NJ (US); Gordon Wilfong, Florham Park, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/484,903

(22) Filed: Sep. 12, 2014

(65) Prior Publication Data
US 2016/0078220 A1    Mar. 17, 2016

(51) Int. Cl.
| | | |
|---|---|---|
| G06F 17/00 | (2006.01) | |
| G06F 21/51 | (2013.01) | |
| G06F 21/62 | (2013.01) | |
| H04L 12/24 | (2006.01) | |

(52) U.S. Cl.
CPC .............. *G06F 21/51* (2013.01); *G06F 21/629* (2013.01); *H04L 41/12* (2013.01); *H04L 41/14* (2013.01); *H04L 41/0893* (2013.01)

(58) Field of Classification Search
CPC .............................. G06F 21/51; G06F 21/629
USPC ............................................................ 726/1
See application file for complete search history.

(56) References Cited

U.S. PATENT DOCUMENTS

| | | |
|---|---|---|
| 6,456,600 B1 | 9/2002 | Rochberger et al. |
| 8,082,337 B1 | 12/2011 | Davis et al. |
| 2004/0215978 A1* | 10/2004 | Okajo ............... H04L 63/0227 726/1 |

(Continued)

FOREIGN PATENT DOCUMENTS

| | | |
|---|---|---|
| EP | 2 461 547 | 6/2012 |
| EP | 2629454 | 8/2013 |

(Continued)

OTHER PUBLICATIONS

International Search Report and Written Opinion of PCT/US2015/011962, dated Apr. 30, 2015, pp. 1-13.

(Continued)

*Primary Examiner* — Mohammad W Reza
(74) *Attorney, Agent, or Firm* — Tong, Rea, Bentley & Kim, LLC

(57) ABSTRACT

A capability for providing policy enforcement in a topology abstraction system is presented. The capability for providing policy enforcement in a topology abstraction system may support use of topology abstraction policies to control abstraction of topology information of a topology (e.g., a network topology of a communication network or any other suitable type of topology). The capability for providing policy enforcement in a topology abstraction system providing an abstract representation of a topology may support use of topology abstraction policies to control selection (or acceptance) of topology elements for inclusion within the abstract representation of a topology and filtering (or rejection) of topology elements from being included within the abstract representation of a topology. The capability for providing policy enforcement in a topology abstraction system providing an abstract representation of a topology may support use of topology abstraction policies to control clustering of topology elements selected for inclusion within the abstract representation of the topology.

19 Claims, 16 Drawing Sheets

(56) References Cited

U.S. PATENT DOCUMENTS

| | | | |
|---|---|---|---|
| 2007/0263544 A1 | 11/2007 | Yamanaka et al. | |
| 2009/0125620 A1 | 5/2009 | Klincewicz | |
| 2015/0207703 A1* | 7/2015 | Gallagher | G06F 11/3006 709/224 |

FOREIGN PATENT DOCUMENTS

| | | |
|---|---|---|
| EP | 2760160 | 7/2014 |
| WO | WO 2013/066602 | 5/2013 |

OTHER PUBLICATIONS

Stiemerling et al., "ALTO Deployment Considerations," ALTO Internet Draft, Version 10, Jul. 3, 2014, pp. 1-55.

Scharf et al., "ATLAS: Accurate Topology Level-of-Detail Abstraction System," Network Operations and Management Symposium (NOMS), Krakow, Poland, May 5-9, 2014, pp. 1-5.

Scharf et al., "Dynamic VPN Optimization by ALTO Guidance," 2013 Second European Workshop on Software Defined Networks (EWSDN), Berlin, Germany, Oct. 10-11, 2013, pp. 1-6.

Scharf et al., "Sparsifying Network Topologies for Application Guidance," IFIP/IEEE International Symposium on Integrated Network Management, Ottawa, Canada, May 11-15, 2015, pp. 1-9.

7750 Service Router, Alcatel-Lucent, www.alcatel-lucent.com/products/7750-service-router, downloaded Apr. 23, 2015, pp. 1-2.

King et al., "A PCE-based Architecture for Applications-based Network Operations," Internet Engineering Task Force, Oct. 21, 2013, pp. 1-96.

Medved et al., "An Information Model for Network Topologies," Network Working Group, Jul. 15, 2013, pp. 1-16.

Stiemerling et al., "ALTO Deployment Considerations," ALTO Internet Draft, Version 9, Feb. 11, 2014, pp. 1-52.

Seedorf et al., "Application-Layer Traffic Optimization (ALTO) Problem Statement," Network Working Group, RFC 5693, Oct. 2009, pp. 1-14.

Davidson et al., "Clustering With Constraints Web Site," http://web.cs.ucdavis.edu/~davidson/constrained-clustering/, printed on Jun. 3, 2015.

Erciyes, G. and Marshall, G, "A Cluster Based Hierarchical Routing Protocol for Mobile Networks", Computational Science and its Applications, ICCSA 2004, vol. 3045, pp. 528-537.

Rai, P., "Data Clustering: K-means and Hierarchical Clustering", CS5350/6350: Machine Learning Oct. 4, 2011, total pp. 24.

Hui, J. and Wu, Y., "Scalable Ad-Hoc Network Routing Based on the Distance-Matrix Shortest Path Routing," Proceedings of the 2004 IEEE International Conference on Networking, Sensing & Control, Taiwan, Mar. 21-23, 2004, pp. 94-99.

Hui, J. and Wu, Y., "Distance-Matrix Routing: A Scalable Ad-Hoc Wireless IP Routing," Globecom 2003, pp. 3047-3052.

* cited by examiner

… (1) …

POLICY ENFORCEMENT IN A TOPOLOGY ABSTRACTION SYSTEM

TECHNICAL FIELD

The disclosure relates generally to communication networks and, more specifically but not exclusively, to abstraction of network topology information of communication networks.

BACKGROUND

In general, network topology information for a network may be used for various purposes, such as managing the network, managing services offered via the network, controlling the operation of network-aware applications provided via the network (e.g., content delivery networks (CDNs), cloud computing solutions, or other applications that typically require insight into the underlying network topology), or the like. Various applications may make use of network topology information for such purposes; however, in many cases, it may be necessary or desirable to make only a portion of the available network topology information available to the application. For example, the network operator of the network may have an interest in preventing certain portions of the topology information from being made available to the applications (e.g., in order to protect proprietary information, for security purposes, or the like), the applications may require only certain portions of the available network topology information, or the amount of available network topology information may simply be too large (e.g., to be handled by clients of the application, to be useful to users of the application, or the like). Accordingly, various network topology exposure capabilities have been developed for use in controlling the portions of the network topology of a network that are exposed to applications. In many cases, network topology exposure capabilities may control portions of the network topology that are exposed to applications by abstracting portions of the network topology information in a manner that preserves relevant portions of the network topology information while also eliminating portions of the network topology information that it may be necessary or desirable to remove. An example of one such widely used network topology exposure capability is the Application-Layer Traffic Optimization (ALTO) protocol developed by the Internet Engineering Task Force (IETF). For example, a network operator can provide one or more ALTO servers having one or more views of the network which may be exposed to ALTO clients of applications. The ALTO servers may support various services, such as providing one or more network maps, one or more cost maps, one or more ranking services, and so forth. Disadvantageously, however, existing versions of the ALTO protocol as well as other network topology exposure capabilities do not support policy enforcement in conjunction with abstraction of network topology information.

SUMMARY OF EMBODIMENTS

Various deficiencies in the prior art may be addressed by embodiments for supporting policy enforcement in a topology abstraction system.

In at least some embodiments, an apparatus includes a processor and a memory communicatively connected to the processor, wherein the processor is configured to receive topology information describing a set of topology elements of a topology, assign respective classifications to the topology elements in the set of topology elements based on a set of topology abstraction policies, and determine, for each of the topology elements of the set of topology elements based on the respective classifications of the topology elements, whether to select the topology element for inclusion in an abstract representation of the topology.

In at least some embodiments, a method includes receiving topology information describing a set of topology elements of a topology, assigning respective classifications to the topology elements in the set of topology elements based on a set of topology abstraction policies, and determining, for each of the topology elements of the set of topology elements based on the respective classifications of the topology elements, whether to select the topology element for inclusion in an abstract representation of the topology.

In at least some embodiments, a computer-readable storage medium stores instructions which, when executed by a computer, cause the computer to perform a method that includes receiving topology information describing a set of topology elements of a topology, assigning respective classifications to the topology elements in the set of topology elements based on a set of topology abstraction policies, and determining, for each of the topology elements of the set of topology elements based on the respective classifications of the topology elements, whether to select the topology element for inclusion in an abstract representation of the topology.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability for providing policy enforcement in a topology abstraction system is presented. The capability for providing policy enforcement in a topology abstraction system may support use of topology abstraction policies to control abstraction of topology information of a topology (e.g., a network topology of a communication network or any other suitable type of topology). The capability for providing policy enforcement in a topology abstraction system providing an abstract representation of a topology may support use of topology abstraction policies to control selection (or acceptance) of topology elements for inclusion within the abstract representation of a topology and filtering (or rejection) of topology elements from being included within the abstract representation of a topology. The capability for providing policy enforcement in a topology abstraction system providing an abstract representation of a topology may support use of topology abstraction policies to control clustering of topology elements selected for inclusion within the abstract representation of the topology. The capability for providing policy enforcement in a topology abstraction system may be provided within the context of a topology exposure system (e.g., for exposing network topology information to clients using Application-Layer Traffic Optimization (ALTO) or any other suitable network topology exposure capability) or any other suitable type of system or environment in which topology abstraction may be used. These and various other embodiments and advantages of the capability for providing policy enforcement in a topology abstraction system may be further understood when considered within the context of an exemplary topology exposure system, as depicted in FIG. 1.

Figure 1:
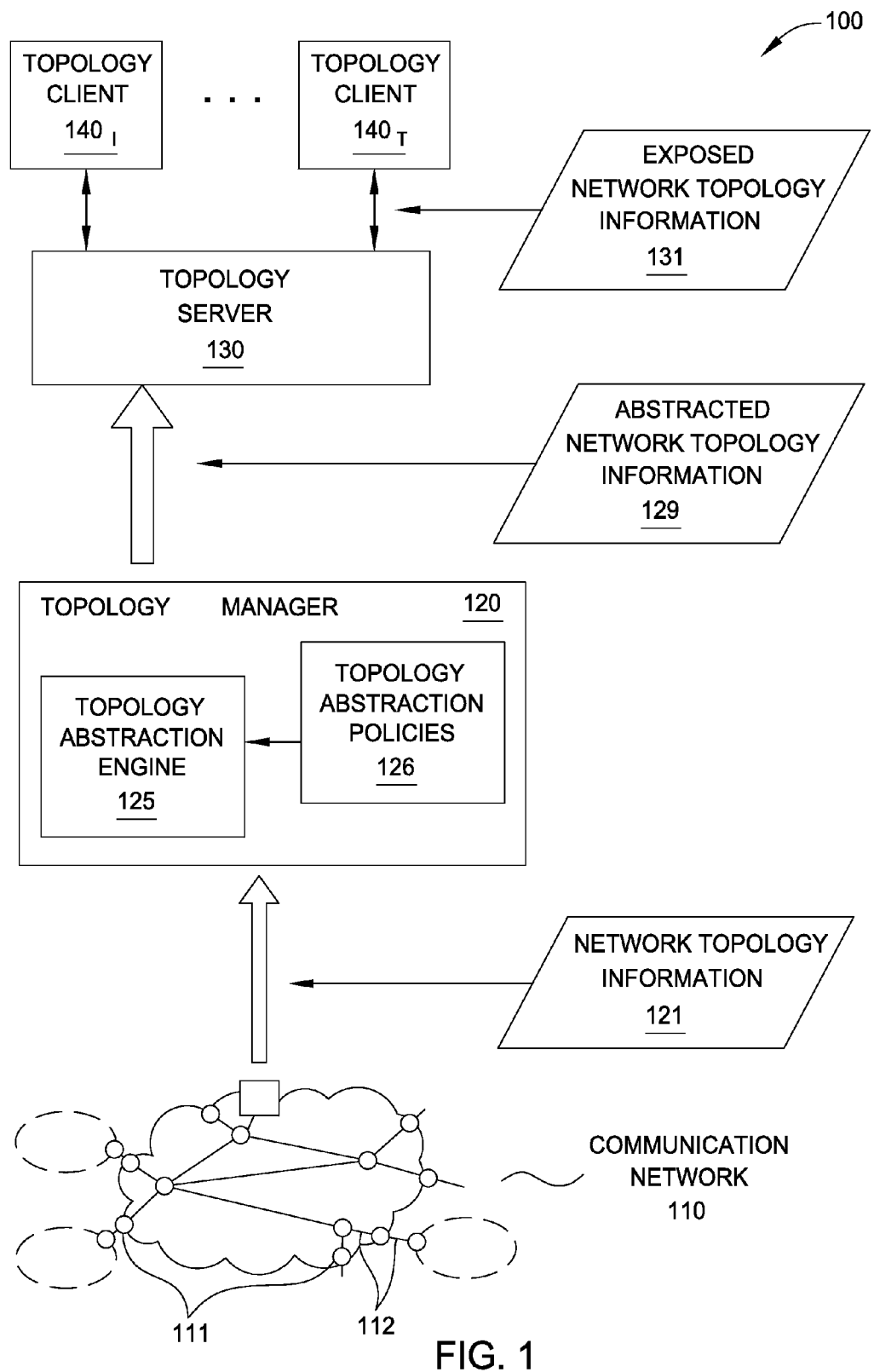
FIG. 1 depicts an exemplary topology exposure system including a topology manager configured to support network topology abstraction for a communication network for which network topology information is to be exposed.

FIG. 1 depicts an exemplary topology exposure system including a topology manager configured to support network topology abstraction for a communication network for which network topology information is to be exposed.

The topology exposure system 100 includes a communication network 110, a topology manager 120, a topology server 130, and a set of topology clients $140_1$-$140_T$ (collectively, topology clients 140).

The communication network 110 is a network for which network topology management is performed. The communication network 110 may include various nodes 111 (e.g., end user devices, access nodes, switches, routers, caches, control elements, or the like) and communication links 112. The interconnection of the nodes 111 via the communication links 112 forms a network topology of the communication network 110.

The topology manager 120 is configured to perform network topology management functions for communication network 110. The topology manger 120 is configured to obtain network topology information 121 that describes the network topology of communication network 110. The topology manager 120 may receive network topology information 121 from nodes 111 of the communication network 110 (e.g., via reporting from nodes 111, by querying nodes 111, or the like), from one or more management systems configured to perform management functions for the communication network 110 (e.g., one or more Element Management Systems (EMSs), a Network Management Systems (NMS), or the like), by passively monitoring routing protocol messages, or the like, as well as various combinations thereof. The topology manager 120 may represent network topology information 121 in various ways. For example, topology manager 120 may represent various portions of the network topology information 121 using one or more graph-based representations of network topology information 121, using one or more matrix-based representation of network topology information 121, or the like, as well as various combinations thereof. The topology manager 120 may generate representations of the network topology information 121 (e.g., graphs, matrices, or the like) based on processing of the network topology information 121 received by topology manager 120. The topology manager 120 is configured to process the network topology information 121 in a manner for abstracting the network topology information 121 to form abstracted network topology information 129. As depicted in FIG. 1, topology manager 120 may process the network topology information 121 using a topology abstraction engine 125, based on topology abstraction policies 126, to form the abstracted network topology information 129. An exemplary topology abstraction engine is depicted and described with respect to FIG. 2. The abstracted network topology information 129 may include portions of the network topology information 121 received by the topology manager 120, representations of network topology information 121 which may be generated by topology manager 120 (e.g., one or more network maps, one or more cost maps, or the like, as well as various combinations thereof), or the like, as well as various combinations thereof. The topology manager 120 is configured to export abstracted network topology information 129 to the topology server 130 for use by the topology server 130 in serving requests from the topology clients 140. The topology manager 120 may be configured to perform various other topology management functions.

The topology server 130 is configured to control exposure of abstracted network topology information 129 to the topology clients 140 where portions of the abstracted network topology information 129 that are exposed to topology clients 140 are denoted as exposed network topology information 131. The topology server 130 is configured to receive abstracted network topology information 129 from topology manager 120 and to store abstracted network topology information 129 for use in responding to requests from the topology clients 140. The topology server 130 is configured to receive requests from topology clients 140 and to respond to requests from topology clients 140 based on the abstracted network topology information 129. The topology server 130 may support various types of services which may support exposure of various types of information at various granularities. For example, topology server 130 may support network maps, cost maps, ranking services, or the like, as well as various combinations thereof. The topology server 130 may support at least some of these services based on the abstracted network topology information 129. The topology server 130 may be configured to control exposure of the abstracted network topology information 129 to topology clients 140 based on topology exposure policies (e.g., one or more policies of the network operator of communication network 110, one or more policies of an application with which topology clients 140 are associated, or the like, as well as various combinations thereof). The topology server 130 may be configured to provide various other functions for controlling exposure of the abstracted network topology information 129 to the topology clients 140.

The topology clients 140 may include any clients which may access abstracted network topology information 129 from topology server 130. The topology clients 140 may send requests for topology information to topology server 130, receive topology information from topology server 130, and present the topology information via one or more presentation interfaces of the topology clients 140. The topology clients 140 may request various types of topology information which may be presented at topology clients 140 in various ways. The topology clients 140 may be running on any suitable devices (e.g., operations center workstations, desktop computers, laptop computers, tablet computers, smartphones, or the like). The topology clients 140 may be associated with a particular application, and exposure of network topology information of communication network 110 to topology clients 140 may be based on the application with which the topology clients 140 are associated. The typical manner in which topology clients 140 may access sparsified network topology information 129 from topology server 130 will be understood by one skilled in the art.

The topology exposure system 100, as discussed above, may be based on ALTO or any other suitable network topology exposure capability. In the case of ALTO, for example, topology server 130 may be an ALTO server and topology clients 140 may be ALTO clients, where the ALTO server and the ALTO clients communicate using the ALTO protocol. As discussed above, an ALTO server can support various services. For example, ALTO may define a network map that partitions the network into a set of groups referred to as PIDs, and may define a cost map that encodes costs between the PIDs from the perspective of the ALTO server. As also discussed above, topology manager 120 is configured to determine abstracted network topology information based on processing of received network topology information using topology abstraction policies, which may be performed within the context of ALTO-based capabilities which may be supported by the ALTO server and the ALTO clients. It will be appreciated that the topology exposure system 100 may be based on any other suitable network topology exposure capability.

Figure 2:
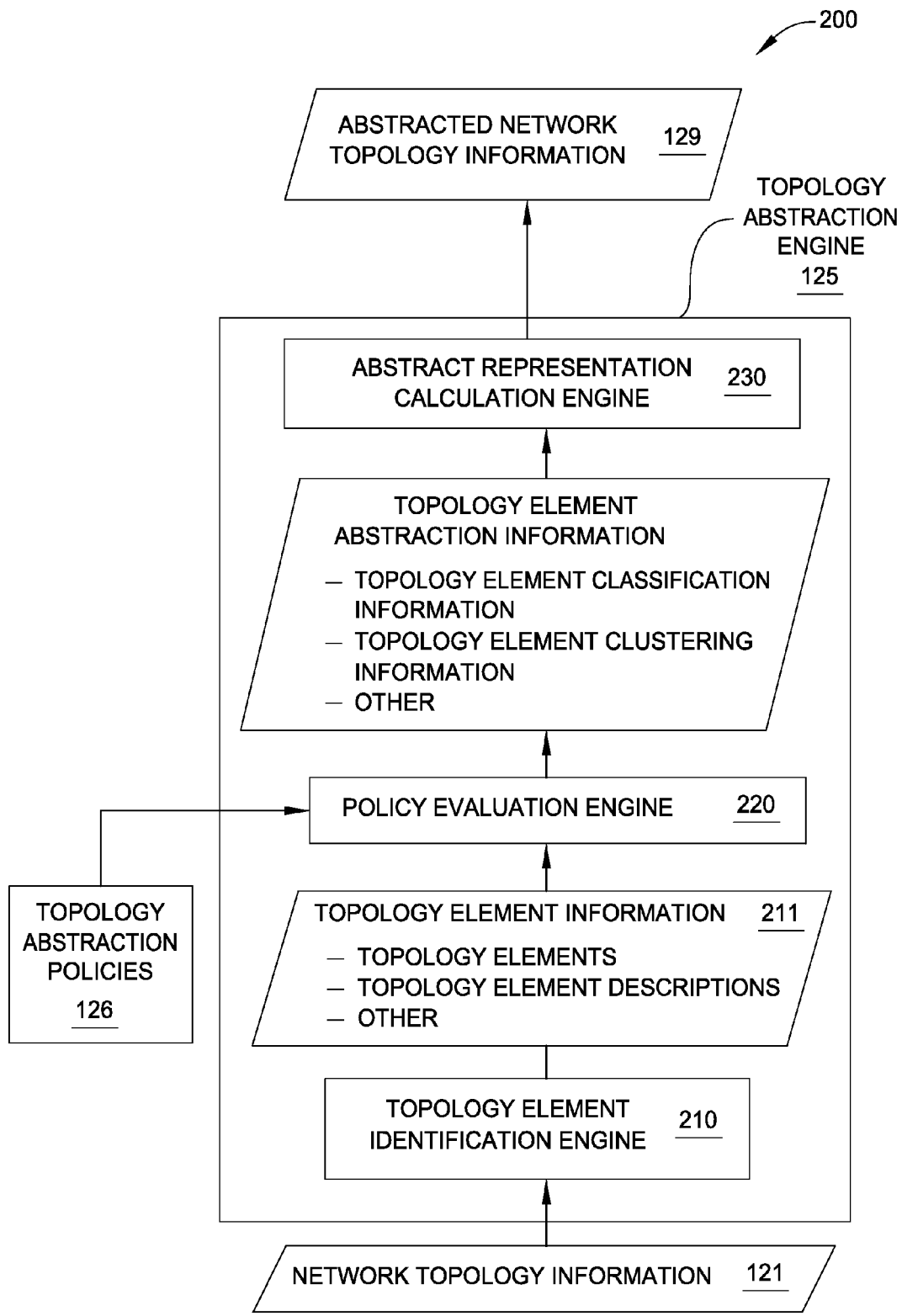
FIG. 2 depicts an exemplary embodiment of the topology abstraction engine of the topology manager of FIG. 1.

FIG. 2 depicts an exemplary embodiment of the topology abstraction engine of the topology manager of FIG. 1.

As depicted in FIG. 2, topology abstraction engine 125, as also depicted and described with respect to FIG. 1, is configured to receive the network topology information 121 as input and provide the abstracted network topology information 129 as output. The topology abstraction engine 125 includes a topology element identification engine 210, a policy evaluation engine 220, and an abstract representation calculation engine 230. The topology abstraction engine 125 may be software configured to be stored in memory and execute by a process to provide the various functions of topology abstraction engine 125, one or more hardware elements, or the like, as well as various combinations thereof. Similarly, the various elements of which topology abstraction engine 125 is composed may be software modules (e.g., where topology abstraction engine 125 in software), hardware modules (e.g., where topology abstraction engine 125 is composed or one or more hardware elements), or the like, as well as various combinations thereof.

The topology element identification engine 210 is configured to receive network topology information 121 and output topology element information 211. The topology element identification engine 210 is configured to process network topology information 121 to produce the topology element information 211. The topology element identification engine 210 is configured to process network topology information 121 to identify topology elements of the topology of communication network 110 (denoted as topology elements of topology element information 211, which may be a list of topology elements to be evaluated by policy evaluation engine 220). The topology elements may include network elements (e.g., end user devices, routers, switches, caches, or the like), communication links, or any other elements which may be part of the topology of communication network 110. The topology elements may be identified based on topology element identifiers, topology element addresses, or the like, as well as various combinations thereof. The topology element identification engine 210 is configured to process the network topology information 121 to extract or determine therefrom topology element description information associated with the identified topology elements (denoted as topology element descriptions of topology element information 211). The topology element description information for a topology element may include one or more addresses of the topology element (e.g., Internet Protocol (IP) address, Media Access Control (MAC) address, or any other suitable addresses), identification of a group of addresses with which the topology element is associated (e.g., an IP subnet range with which the topology element is associated), Autonomous System (AS) description information associated with the topology element (e.g., AS number, AS community value, or the like), identification of a source of topology information for the topology element (e.g., identification of a system from which the topology information for the topology element is obtained, identification of a routing protocol providing the topology information for the topology element (e.g., Border Gateway Protocol (BGP), Intermediate System to Intermediate System (ISIS), Open Shortest Path First (OSPF), Routing Information Protocol (RIP), and so forth), or the like), one or more protocol parameters of the routing protocol providing the topology information for the topology element (e.g., one or more BGP parameters, one or more ISIS parameters, one or more OSPF parameters, one or more RIP parameters, or the like), metadata, or the like, as well as various combinations thereof. The topology element information 211 may include other types of topology element information. The topology element information 211 may include other types of topology element information which may be used by policy evaluation engine 220 for evaluating topology elements of the topology of communication network 110). The topology element identification engine 210 is configured to provide the topology element information 211 to the policy evaluation engine 220.

The policy evaluation engine 220 is configured to receive topology element information 211 and output topology element abstraction information 227. The policy evaluation engine 220 is configured to evaluate topology element information 211, based on topology abstraction policies 126, to produce topology element abstraction information 227.

The policy evaluation engine 220 is configured to evaluate the topology elements of topology element information 211, based on topology abstraction policies 126, in order to classify the topology elements (which then may be referred to as classified topology elements) of topology element information 211. The policy evaluation engine 220 may classify the topology elements by looping over the topology elements and the topology abstraction policies 126 (e.g., considering each topology element in an outer loop and evaluating each of the topology elements with respect to each of the topology abstraction policies 126 by considering each of the topology abstraction policies 126 in an iterative inner loop, considering each topology abstraction policy 126 in an outer loop and evaluating each of the topology elements with respect to each of the topology abstraction policies 126 by considering each of the topology elements in an iterative inner loop, or the like). The policy evaluation engine 220 may evaluate each of the topology elements for classifying the topology elements by evaluating each of the topology elements with respect to one or more of the topology abstraction policies 126. For example, for a given topology element, policy evaluation engine 220 may classify the given topology element by evaluating the given topology element with respect to topology abstraction policies 126 until identifying the first topology abstraction policy 126 to which the topology element applies (which may then be used as a basis for classifying the given topology element). For example, for a given topology element, policy evaluation engine 220 may classify the given topology element by evaluating the given topology element with respect to each of the topology abstraction policies 126 and classifying the topology element based on each of the topology abstraction policies 126 to which the topology element applies. For example, for a given topology element, policy evaluation engine 220 may classify the given topology element by evaluating the given topology element with respect to each of the topology abstraction policies 126 and classifying the topology element based on a selected one of the topology abstraction policies 126 to which the topology element applies (e.g., a most important topology abstraction policy 126 of the topology abstraction policies 126 to which the topology element applies). For example, for a given topology abstraction policy 126, policy evaluation engine 220 may evaluate each of the topology elements with respect to the given topology abstraction policy 126 and classify, based on the given topology abstraction policy 126, each of the topology elements to which the given topology abstraction policy 126. The policy evaluation engine 220 may classify the topology elements by looping over the topology elements and the topology abstraction policies 126 in various other ways. The policy evaluation engine 220 may classify the topology elements by evaluating each of the topology elements with respect to various combinations of the topology abstraction policies 126 in various other ways. The classifications of the topology elements may be indicative as to representation of the topology elements in the abstracted network topology information (e.g., which topology elements are selected for inclusion within abstracted network topology information 129 and which topology elements are filtered for preventing their inclusion within abstracted network topology information 129, types of clustering applied to topology elements selected for inclusion within abstracted network topology information 129 (e.g., anti-affinity clustering or affinity clustering), or the like, as well as various combinations thereof.

The policy evaluation engine 220 may be configured to determine which of the topology elements are included within abstracted network topology information 129. The policy evaluation engine 220 may be configured to determine, based on evaluation of topology element information 211 for the topology elements using the topology abstraction policies 126, which topology elements are selected for inclusion within abstracted network topology information 129 and which topology elements are filtered for preventing their inclusion within abstracted network topology information 129. The policy evaluation engine 220 may be configured to determine, based on the classifications of the topology elements, which topology elements are selected for inclusion within abstracted network topology information 129 (e.g., based on assigning of an ACCEPT or REFERENCE classification to such topology elements, as discussed further below) and which topology elements are filtered for preventing their inclusion within abstracted network topology information 129 (e.g., based on assigning of a REJECT classification to such topology elements, as discussed further below). This information may be referred to herein as topology element selection information, topology element inclusion information, topology element filtering information, or the like.

The policy evaluation engine 220 may be configured to determine, for topology elements selected for inclusion within abstracted network topology information 129, clustering of the topology elements selected for inclusion within abstracted network topology information 129. The policy evaluation engine 220 may be configured to determine clustering of the topology elements selected for inclusion within abstracted network topology information 129 based on the classifications of the topology elements. The policy evaluation engine 220 may be configured to perform a first type of clustering for topology elements selected for inclusion within abstracted network topology information 129 and having a first classification associated therewith (e.g., using anti-affinity clustering for topology elements classified using a REFERENCE classification as discussed further below) and to perform a second type of clustering for topology elements selected for inclusion within abstracted network topology information 129 and having a second classification associated therewith (e.g., using affinity clustering for topology elements classified using an ACCEPT classification as discussed further below). This information may be referred to herein as topology element clustering information.

The topology element abstraction information 227 may include any information suitable for use by abstract representation calculation engine 230 in determining abstracted network topology information 129. In at least some embodiments, topology element abstraction information 227 may include topology element classification information (e.g., for each of the topology elements, respective classifications of the topology elements) without any corresponding topology element clustering information (e.g., each topology element is included within abstracted network topology information 129 without clustering or excluded from inclusion within abstracted network topology information 129). In at least some embodiments, topology element abstraction information 227 may include topology element classification information and topology element clustering information (e.g., cluster lists for clusters into which topology elements have been grouped, cluster description information for clusters into which topology elements have been grouped, cluster cost information for clusters into which topology elements have been grouped (e.g., costs between clusters), or the like, as well as various combinations thereof). The topology element abstraction information 227 may include any other information suitable for use by abstract representation calculation engine 230 in determining abstracted network topology information 129.

The policy evaluation engine 220 is configured to provide the topology element abstraction information 227 to abstract representation calculation engine 230.

The abstract representation calculation engine 230 is configured to receive the topology element abstraction information 227 and output the abstracted network topology information 129. The abstract representation calculation engine 230 may use the topology element abstraction information 227 to determine the abstracted network topology information 129. The abstracted network topology information 129 may be the topology element abstraction information 227 or a processed version of the topology element abstraction information 227 (e.g., where additional processing is performed in order to generate abstracted network topology information 129 from the topology element abstraction information 227). The abstracted network topology information 129 may include one or more abstract representations of the network topology information 121 and, thus, of the topology of communication network 110 (e.g., network maps based on clustering of topology elements, cost maps based on clustering of topology elements, or the like, as well as various combinations thereof). The abstracted network topology information 129 may include any other abstract representations of the network topology information 121 and, thus, of the topology of communication network 110.

The topology abstraction engine 125, as discussed above, is configured to abstract network topology information 121 to form abstracted network topology information 129 based on topology abstraction policies 126, which may be configured in various ways.

The topology abstraction policies 126 may be configured to classify topology elements based on various types of information associated with the topology elements. For example, topology abstraction policies 126 may be configured to classify a topology element based on one or more addresses of the topology element (e.g., IP address, MAC address, or any other suitable addresses), identification of a group of addresses with which the topology element is associated (e.g., an IP subnet range with which the topology element is associated), AS description information associated with the topology element (e.g., AS number, AS community value, or the like), identification of a source of topology information for the topology element (e.g., identification of a system from which the topology information for the topology element is obtained, identification of a routing protocol providing the topology information for the topology element (e.g., BGP, ISIS, OSPF, RIP, and so forth), or the like), one or more protocol parameters of the routing protocol providing the topology information for the topology element (e.g., one or more BGP parameters, one or more ISIS parameters, one or more OSPF parameters, one or more RIP parameters, or the like), metadata, or the like, as well as various combinations thereof. Exemplary topology abstraction policy syntax illustrating use of such information for defining and evaluating topology elements is depicted and described with respect to FIGS. 4A-4B.

The topology abstraction policies 126 may be configured to classify topology elements using any suitable classifications.

In at least some embodiments, topology abstraction policies 126 may be configured to classify topology elements using two classifications: (1) a REJECT classification which is assigned to topology elements which are to be filtered from being included within the abstracted network topology information 129 (e.g., such that they are not exposed to topology clients 140 as part of the exposed network topology information 131) and (2) an ACCEPT classification which is assigned to topology elements which are to be selected for inclusion within the abstracted network topology information 129 (e.g., such that they may be exposed to topology clients 140 as part of the exposed network topology information 131).

In at least some embodiments, topology abstraction policies 126 may be configured to classify topology elements based on three classifications: (1) a REJECT classification which is assigned to topology elements which are to be filtered from being included within the abstracted network topology information 129 (e.g., such that they are not exposed to topology clients 140 as part of exposed network topology information 131)), (2) an ACCEPT classification which is assigned to topology elements which are to be selected for inclusion within the abstracted network topology information 129 (e.g., such that they may be exposed to topology clients 140 as part of the exposed network topology information 131) and clustered using affinity clustering, and (3) a REFERENCE classification which is assigned to topology elements which are to be selected for inclusion within the abstracted network topology information 129 (e.g., such that they may be exposed to topology clients 140 as part of the exposed network topology information 131) and clustered using anti-affinity-based clustering. It is noted that, here, the REFERENCE classification may be considered to be a special case of the ACCEPT classification (as both classifications result in selection of the respective topology elements for inclusion within the abstracted network topology information 129). Exemplary topology abstraction policy syntax configured to classify topology elements according to the REJECT, ACCEPT, and REFERENCE classifications is presented with respect to FIGS. 4A-4B. An exemplary embodiment of a method for abstracting network topology information, based on these three classifications, to form abstracted network topology information is depicted and described with respect to FIG. 5.

In at least some embodiments, as discussed above, association of the REJECT classification with a topology element filters (or prevents) the topology element from being included within the abstracted network topology information 129 (and, thus, prevents the topology element from being exposed as part of the exposed network topology information 131). However, topology elements classified with the REJECT classification are not necessarily ignored; rather, such topology elements may still be used to determine topology properties for other topology elements which are classified as ACCEPT or REFERENCE. For example, it is possible that all network-internal addresses (e.g., router system addresses) of a network would be covered by one or more REJECT policies in order to avoid leakage (prevent exposure) of such internal information that does not matter to typical applications using the network and, thus, fulfill privacy requirements of the network operator of the network; however, costs on the paths of the routers may be used to determine costs between endpoints that are included in the abstracted network topology information 129 that is used for providing the exposed network topology information 131 that may be exposed to topology clients 140.

In at least some embodiments, as discussed above, association of the ACCEPT classification with a topology element selects (or accepts) the topology element for inclusion within the abstracted network topology information 129 (and, thus, enables the topology element to be exposed as part of the exposed network topology information 131). However, topology elements classified with the ACCEPT classification also may be abstracted in other ways (e.g., via use affinity clustering or the like). For example, affinity clustering may be performed applied to end devices in order to cluster the end devices into clusters, thereby enabling exposure of the clusters of end devices while hiding individual ones of the end devices from being exposed. For example, the addresses of a network may be aggregated by applying IP supernetting, which may enable exposure of the position and connectivity of the addresses within the network without announcing the reachability of the addresses.

In at least some embodiments, as discussed above, association of the REFERENCE classification with a topology element selects (or accepts) the topology element for inclusion within the abstracted network topology information 129 and also enables the topology element to be handled differently than topology elements having the ACCEPT classification. For example, the REFERENCE classification may be used to mark topology element of greater relative importance than other topology elements selected (or accepted) for inclusion within the abstracted network topology information 129 (e.g., topology elements particularly relevant for users of the topology exposure system). For example, the REFERENCE classification may be applied in a topology abstraction policy 126 such that the REFERENCE classification is assigned to a particular topology element in which a network administrator expects that users of the topology exposure system may have a particular interest (e.g., for flagging the addresses of known CDN cache locations). In at least some embodiments, association of the REFERENCE classification with a topology element also may cause an IDENTIFIER (or LABEL) attribute to be applied to or associated with that topology element, where the IDENTIFIER (or LABEL) attribute may be configured to cause an identifier (or label) to be assigned to or associated with the topology element such that the identifier (or label) may be included as part of the abstracted network topology information 129 and, thus, also may be presented to users of topology clients 140 as part of the exposed network topology information 131. For example, where ALTO is used, the IDENTIFIER (or LABEL) attribute may be used to control, or at least influence, the naming of the corresponding PID.

It will be appreciated that topology abstraction policies 126 may be configured to classify topology elements using various other classifications. For example, it is noted that the exemplary classifications discussed herein may be referred to using other suitable terms (e.g., terms other than REJECT, ACCEPT, and REFERENCE). For example, it is noted that the exemplary classifications discussed herein may be structured in other ways. It is noted that fewer or more, as well as different, classifications may be supported by topology abstraction policies 126 for use in classifying topology elements.

The topology abstraction policies 126 may be configured to classify topology elements based on any suitable policy configuration according to which the topology abstraction policies 126 may be defined. The topology abstraction policies 126 may be configured to classify topology elements based on definitions of topology elements to which the topology abstraction policies 126 apply (e.g., based on the information according to which topology elements may be classified, such as addresses, protocol parameters, or the like). The topology abstraction policies 126 may be configured to classify topology elements based on policy rules, where a policy rule may indicate an action to be performed responsive to an identified condition. The condition of a policy rule may be a condition which may be satisfied by topology elements (e.g., based on the information according to which topology elements may be classified, such as addresses, protocol parameters, or the like) and the action of the policy rule may include a classification to be assigned to topology elements satisfying the condition of the policy rule. The topology abstraction policies 126 may be configured to classify topology elements based on various topology element classifications (e.g., than REJECT, ACCEPT, REFERENCE, or the like, as discussed above), which also may be referred to as attributes of topology elements when assigned to topology elements or attributes of topology abstraction policies 126 when used within topology abstraction policies 126 to control classification of topology elements. An exemplary policy configuration for a topology abstraction policy 126 is depicted and described with respect to FIG. 3.

Figure 3:
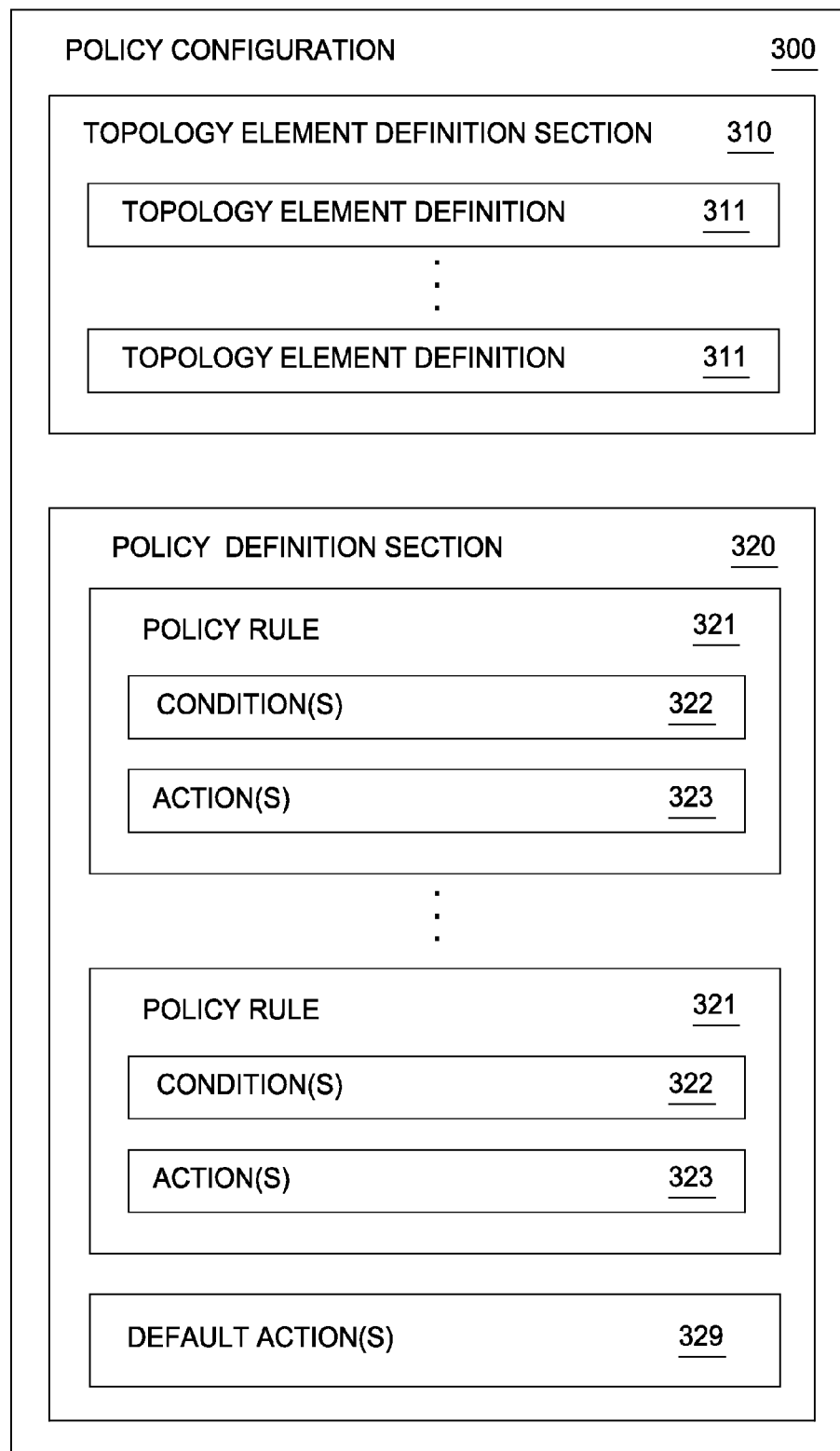
FIG. 3 depicts an exemplary policy configuration for a topology abstraction policy.

FIG. 3 depicts an exemplary policy configuration for a topology abstraction policy. The exemplary policy configuration 300 for a topology abstraction policy 126 includes a topology element definition section 310 and a policy definition section 320.

The topology element definition section 310 of a topology abstraction policy 126 includes topology element definitions 311 of topology elements to which the topology abstraction policy 126 applies. The topology element definitions 311 may be based on the information according to which topology elements may be classified (e.g., addresses, protocol parameters, or the like). The policy evaluation engine 220 may use the topology element definitions 311 of the topology element definition section 310 of a topology abstraction policy 126 to determine whether the topology abstraction policy 126 applies or may apply to a given topology element (e.g., a topology element of topology element information 211 that is being evaluated by policy evaluation engine 220). The topology element definitions 311 of the topology element definition section 310 of a topology abstraction policy 126 may be further understood by way of reference to the exemplary topology abstraction policy syntax that is depicted and described with respect to FIGS. 4A-4B.

The policy definition section 320 of a topology abstraction policy 126 includes policy rules 321 and, optionally, default actions 329. The policy rules 321 are evaluated to determine whether the policy rules 321 apply to a given topology element. The policy rules 321 each include a condition(s) 322 and an associated action(s) 323. The condition(s) 322, like the topology element definitions 311, may be based on the information according to which topology elements may be classified (e.g., addresses, protocol parameters, or the like). The evaluation of a policy rule 321 to determine whether the policy rule 321 applies to a given topology element may include evaluating the condition(s) 322 of the policy rule 321 to determine whether the condition(s) 322 of the policy rule 321 is satisfied for the topology element (e.g., evaluating topology element information 211 for the topology element to determine whether the condition(s) 322 of the policy rule 321 is satisfied for the topology element). The action(s) 323 of a policy rule 321 are applied to a topology element based on a determination that the condition(s) 322 of the policy rule 321 are satisfied for the topology element. The action(s) 323 of a policy rule 321 may specify a classification to be applied to a topology element matching the policy rule 321. For example, where classifications of REJECT and ACCEPT are supported, the action(s) 323 may specify whether the topology element matching that policy rule 321 is classified as REJECT or ACCEPT. Similarly, for example, where classifications of REJECT, ACCEPT, and REFERENCE are supported, the action(s) 323 may specify whether the topology element matching that policy rule 321 is classified as REJECT, ACCEPT, and REFERENCE. The action(s) 323 of a policy rule 321 also may specify a label(s) to be applied to a topology element matching the policy rule 321 where the topology element is selected for inclusion within the abstracted network topology information 129). The policy rules 321 may be organized in a prioritized order or may have priorities associated therewith for use in applying the policy rules in priority order. The policy evaluation engine 220 may use the policy rule(s) 321 of the policy definition section 320 of a topology abstraction policy 126 to determine whether the topology abstraction policy 126 applies or may apply to a given topology element (e.g., a topology element of topology element information 211 that is being evaluated by policy evaluation engine 220), evaluate a given topology element where the topology abstraction policy 126 applies to the given topology element (e.g., based on a comparison of topology element information 211 of the given topology element and the condition(s) 322 of the policy rule(s) 321 of the policy definition section 320), and classify a given topology element based on an action(s) 323 of a policy rule 321 where the given topology element satisfies the condition(s) 322 of the policy rule 321. The evaluation and classification of topology elements based on the policy rule(s) 321 of the policy definition section 320 of a topology abstraction policy 126 may be further understood by way of reference to the exemplary topology abstraction policy syntax that is depicted and described with respect to FIGS. 4A-4B.

It will be appreciated that, although primarily depicted and described with respect to a specific policy configuration (namely, policy configuration 300) for a topology abstraction policy 126, the policy configuration for a topology abstraction policy 126 may be configured in various other ways (e.g., using different arrangements of the information, based on different types of information, or the like, as well as various combinations thereof).

Figure 4A:
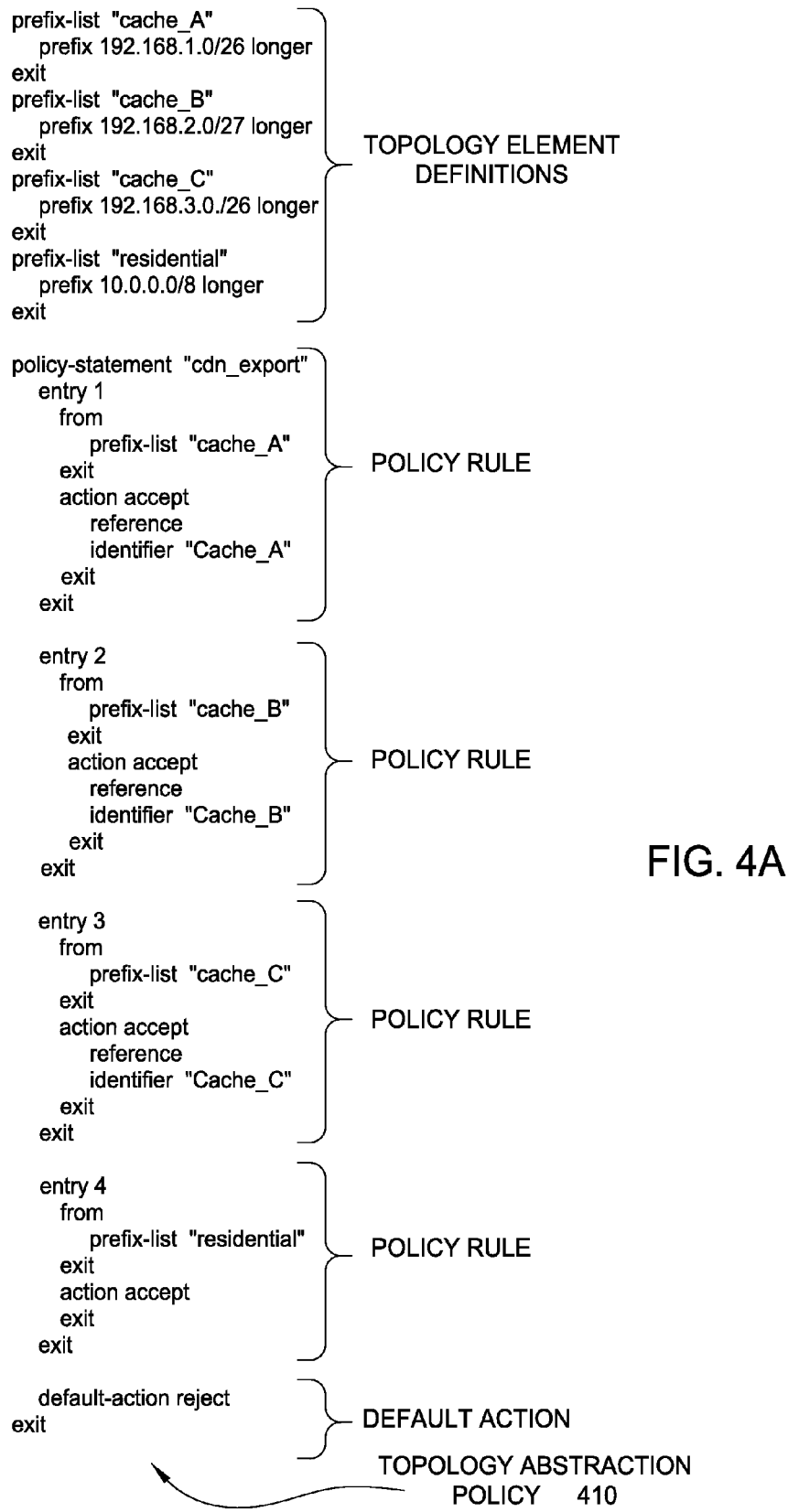
FIGS. 4A and 4B depict exemplary topology abstraction policies illustrating exemplary topology abstraction policy syntax.
Figure 4B:
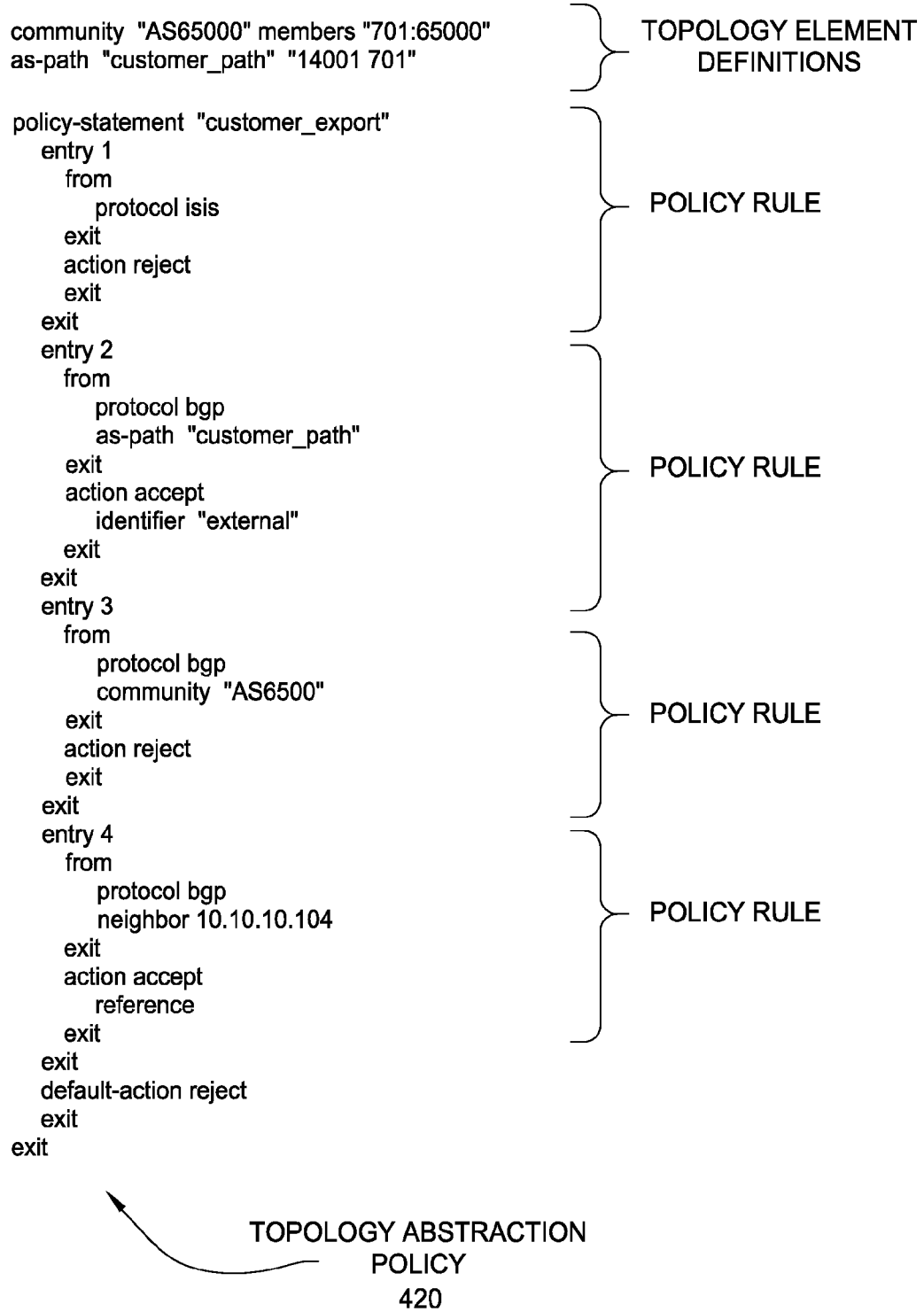

FIGS. 4A and 4B depict exemplary topology abstraction policies illustrating exemplary topology abstraction policy syntax.

Figure 5:
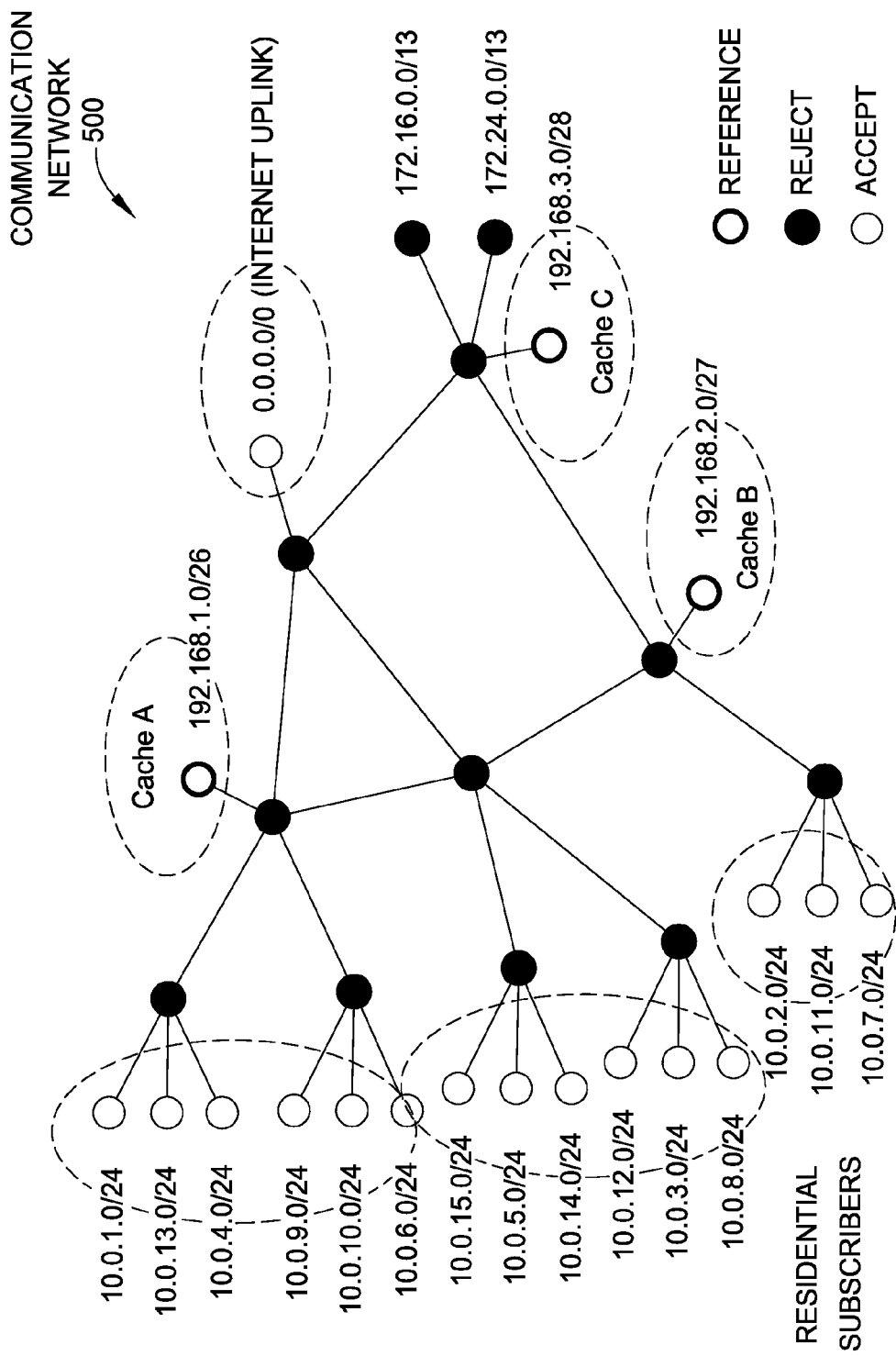
FIG. 5 depicts an exemplary application of the exemplary topology abstraction policy of FIG. 4A to an exemplary communication network.

As depicted in FIG. 4A, the topology abstraction policy 410 includes topology element definitions, policy rules, and a default action, arranged as in policy configuration 300 of FIG. 3. The topology element definitions define the prefix lists for three network caches and a set of residential devices, denoted as CACHE_A (having prefix list 192.168.1.0/26), CACHE_B (having prefix list 192.168.2.0/27), CACHE_C (having prefix list 192.168.3.0/26), and RESIDENTIAL (having prefix list 10.0.0.0/8), respectively. The first policy rule indicates that a topology element matching the prefix list of CACHE_A is to be classified as having the REFERENCE classification and assigned an identifier of "Cache_A" (e.g., it is selected for inclusion within the abstracted network topology information and is assigned an identifier to be displayed as part of the exposed network topology information since it is expected to be clustered based on anti-affinity clustering such that it is not grouped with other topology elements). The second policy rule indicates that a topology element matching the prefix list of CACHE_B is to be classified as having the REFERENCE classification and assigned an identifier of "Cache_B". The third policy rule indicates that a topology element matching the prefix list of CACHE_C is to be classified as having the REFERENCE classification and assigned an identifier of "Cache_C". The fourth policy rule indicates that topology elements matching the prefix list of RESIDENTIAL are to be classified as having the ACCEPT classification (e.g., the topology elements are selected for inclusion within the abstracted network topology information, but are expected to be clustered into one or more clusters based on affinity clustering such that the topology elements do not need individual labels). The application of topology abstraction policy 410 of FIG. 4 to an exemplary communication network is depicted in FIG. 5. The exemplary communication network 500 of FIG. 5 is a Content Delivery Network (CDN) which relies upon underlying communication infrastructure of a network provider (e.g., routers, switches, or the like) in order to support delivery of content from content caches (illustratively, CACHE_A, CACHE_B, and CACHE_C) to residential subscriber devices. As depicted in FIG. 5, elements of the underlying communication infrastructure of the network provider are classified as REJECT (which enables these elements, which may include important proprietary information of the network provider, to remain hidden from topology clients being used to manage the CDN), the residential subscriber devices are classified as ACCEPT elements (which enables these elements to be collapsed into clusters, based on affinity clustering, in order to reduce the amount of network topology information provided to topology clients being used to manage the CDN), and the content caches are classified as REFERENCE elements (which enables these element to remain as standalone elements, based on anti-affinity clustering, in order to ensure that these elements which are important for managing the CDN are clearly visible and accessible to topology clients being used to manage the CDN).

As depicted in FIG. 4B, the topology abstraction policy 420 includes topology element definitions, policy rules, and a default action, arranged as in policy configuration 300 of FIG. 3. The topology element definitions define an autonomous system (AS) community (AS65000), AS community members for the AS community (701:65000), and an AS path (customer_path 14001 701). The first policy rule indicates that an ISIS topology element is to be classified as REJECT. The second policy rule indicates that a BGP topology element having an AS path matching "customer_path" is to be classified as ACCEPT (and assigned an identifier of EXTERNAL). The third policy rule indicates that a BGP topology element associated with AS community AS65000 is to be classified as REJECT. The fourth policy rule indicates that a BGP topology element associated satisfying a neighbor=10.10.10.104 condition is to be classified as REFERENCE.

It will be appreciated that, although primarily depicted and described with respect to specific topology abstraction policies defined based on specific types of topology element information and using specific syntax, topology abstraction policies may be defined based on other types of topology element information, using other types of syntax, or the like, as well as various combinations thereof.

It will be appreciated that, although primarily depicted and described with respect to abstraction of network topology information based on multiple topology abstraction policies 126 where each topology abstraction policy 126 may include one or more policy rules 321, abstraction of network topology information may be performed based on multiple topology abstraction policies 126 where each topology abstraction policy 126 includes only a single policy rule 321, based on a single topology abstraction policy 126 including each of the policy rules 321 which may be applied for abstraction of network topology information, or the like.

Figure 6:
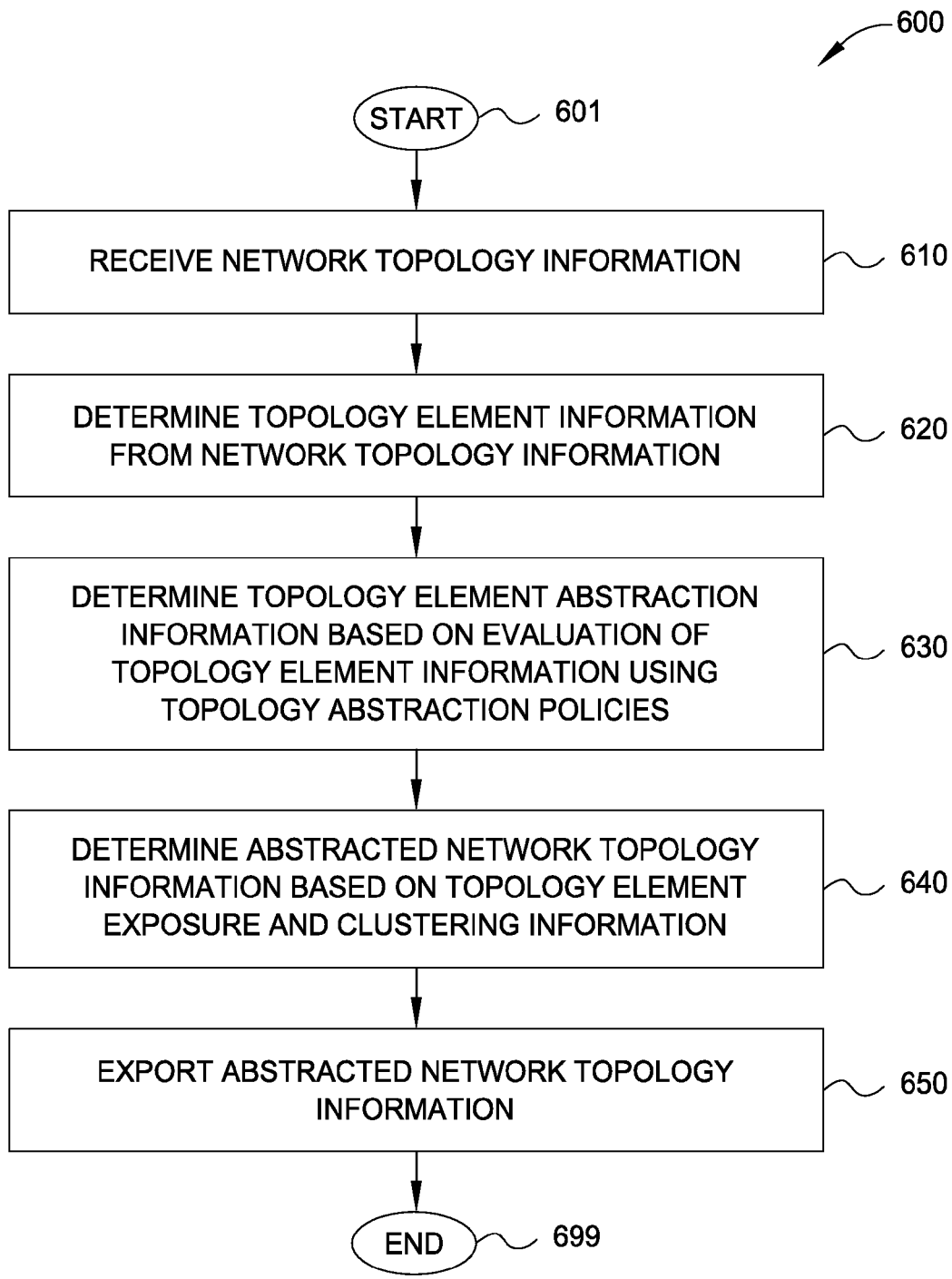
FIG. 6 depicts an exemplary embodiment of a method for abstracting network topology information, based on topology abstraction policies, to form abstracted network topology information.

The topology abstraction engine 125, as discussed above, is configured to abstract network topology information 121 to form abstracted network topology information 129 based on topology abstraction policies 126, which may be performed according to the exemplary method depicted and described with respect to FIG. 6.

FIG. 6 depicts an exemplary embodiment of a method for abstracting network topology information, based on topology abstraction policies, to form abstracted network topology information. It will be appreciated that, although primarily presented as being performed serially, at least a portion of the steps of method 600 may be performed contemporaneously or in a different order than as presented in FIG. 6. At step 601, method 600 begins. At step 610, network topology information is received. The network topology information may be associated with a communication network having topology elements. At step 620, topology element information is determined from the network topology information. The determination of topology element information may include identification of the topology elements, determination of descriptions of the topology elements, or the like. At step 630, topology element exposure and clustering abstraction information is determined based on evaluation of the topology element information based on topology abstraction policies. In at least some embodiments, the topology element abstraction information is determined as depicted and described with respect to FIG. 7. At step 640, abstracted network topology information is determined based on the topology element abstraction information. At step 650, the abstracted network topology information is exported. The abstracted network topology information may be exported to one or more elements (e.g., one or more topology exposure servers, one or more management systems, or the like, as well as various combinations thereof). At step 699, method 600 ends. It is noted that method 600 of FIG. 6 may be further understood when considered in conjunction with FIG. 1 and FIG. 2.

Figure 7:
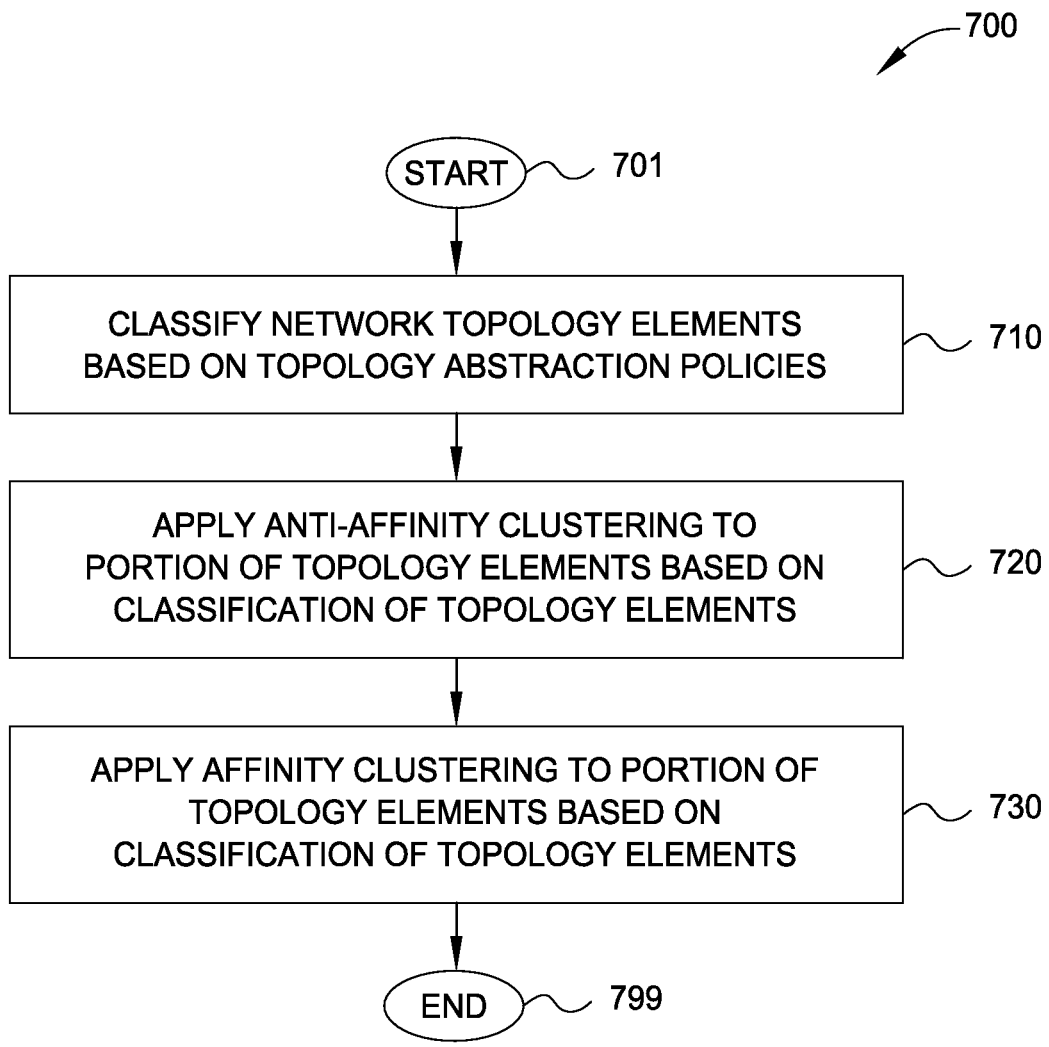
FIG. 7 depicts an exemplary embodiment of a method for evaluating topology elements based on topology abstraction policies.

FIG. 7 depicts an exemplary embodiment of a method for evaluating topology elements based on topology abstraction policies. As noted above, method 700 for evaluating topology elements based on topology abstraction policies may be used to determine topology element abstraction information, based on processing of topology element information obtained from network topology information, for use in determining abstracted network topology information. It will be appreciated that, although primarily presented as being performed serially, at least a portion of the steps of method 700 may be performed contemporaneously or in a different order than as presented in FIG. 7. At step 701, method 700 begins. At step 710, network topology elements are classified based on topology abstraction policies. The network topology elements may be network topology elements of network topology information for a network. An exemplary embodiment of a method for classifying topology elements based on topology abstraction policies is depicted and described with respect to FIG. 8. At step 720, anti-affinity clustering is applied to at least a portion of the topology elements based on classification of the topology elements. The anti-affinity clustering may be applied to ones of the topology elements having a first classification type. The use of anti-affinity clustering enables topology elements satisfying certain topology abstraction policies to be assigned to different clusters. An exemplary embodiment of a method for applying anti-affinity clustering to topology elements is depicted and described with respect to FIG. 9. At step 730, affinity clustering is applied to at least a portion of the topology elements based on classification of the topology elements. The affinity clustering may be applied to ones of the topology elements having a second classification type. The use of affinity clustering enables topology elements satisfying certain topology abstraction policies to be grouped together into clusters. The topology elements may be clustered based on topological properties, metadata, or the like, as well as various combinations thereof. Exemplary embodiments of methods for applying affinity clustering to topology elements are depicted and described with respect to FIG. 11 and FIG. 13.

At step 799, method 700 ends.

Figure 8:
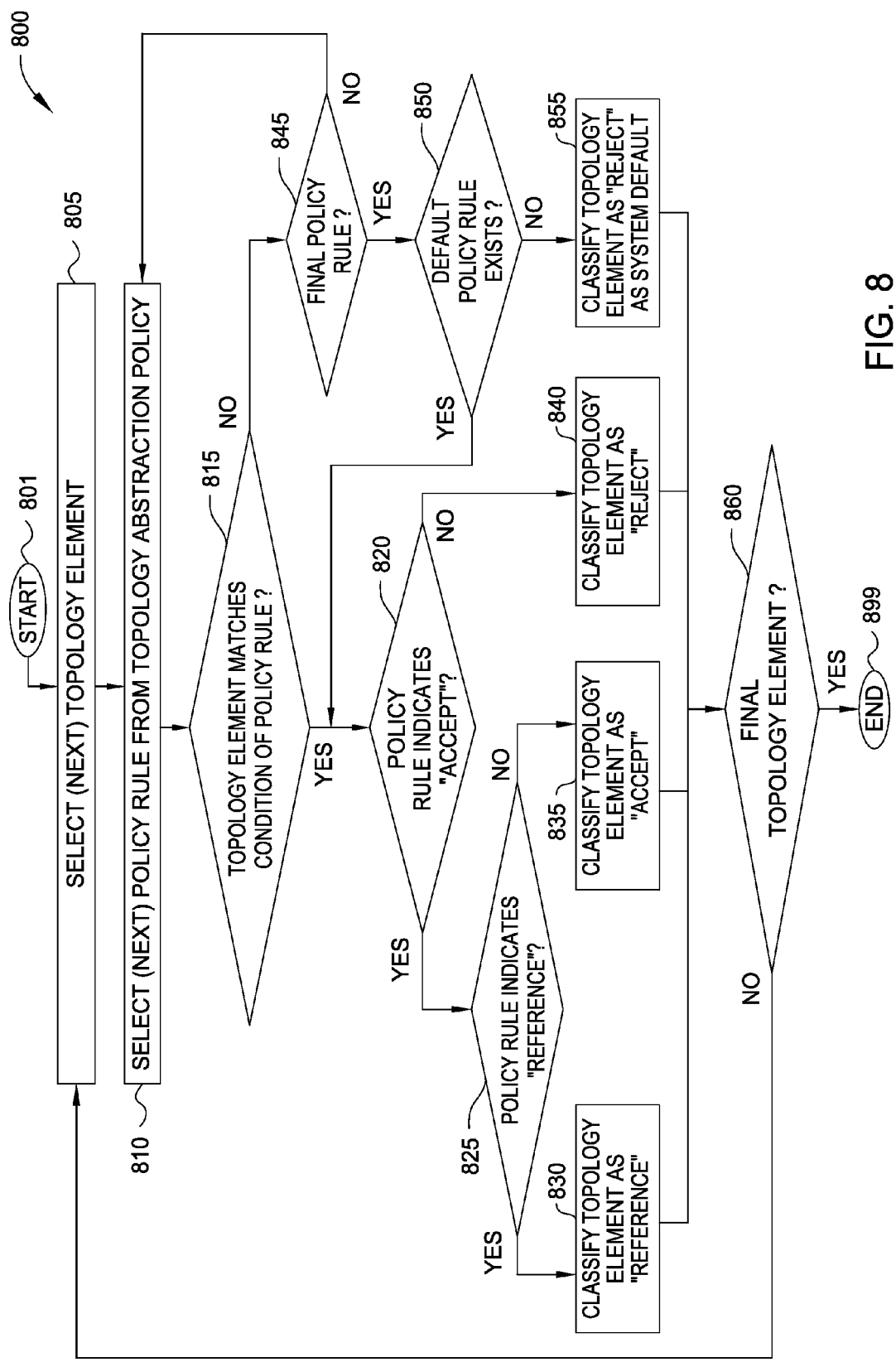
FIG. 8 depicts an exemplary embodiment of a method for classifying topology elements based on a topology abstraction policy supporting three classifications.

FIG. 8 depicts an exemplary embodiment of a method for classifying topology elements based on a topology abstraction policy supporting three classifications. It will be appreciated that, although primarily presented as being performed serially, at least a portion of the steps of method 800 may be performed contemporaneously or in a different order than as presented in FIG. 8. At step 801, method 800 begins. At step 805, a (next) topology element is selected. The topology element may be selected from network topology information. At step 810, a (next) policy rule is selected from the topology abstraction policy. The policy rule may be configured in a manner similar to policy rules 321 depicted and described with respect to FIG. 3. At step 815, a determination is made as to whether the topology element matches the condition of the policy rule. If a determination that the topology element does not match the condition of the policy rule, method 800 proceeds to step 845. If a determination is made that the topology element matches the condition of the policy rule, method 300 proceeds to step 820. At step 820, a determination is made as to whether the policy rule is indicative that the policy element is an ACCEPT topology element. If a determination is made that the policy rule is indicative that the policy element is not an ACCEPT topology element, method 800 proceeds to step 840 (at which point the topology element is classified as a REJECT topology element) and then further proceeds to step 860. If a determination is made that the policy rule is indicative that the policy element is an ACCEPT topology element, method 800 proceeds to step 825. At step 825, a determination is made as to whether the policy rule is indicative that the policy element is a REFERENCE topology element. If a determination is made that the policy rule is indicative that the policy element is a REFERENCE topology element, method 800 proceeds to step 830 (at which point the topology element is classified as a REFERENCE topology element) and then further proceeds to step 860. If a determination is made that the policy rule is indicative that the policy element is not a REFERENCE topology element, method 800 proceeds to step 835 (at which point the topology element is classified as an ACCEPT topology element) and then further proceeds to step 860. At step 845, a determination is made as to whether the selected policy rule is the final topology rule of the topology abstraction policy. If a determination is made that the selected policy rule is not the final topology rule of the topology abstraction policy, method 800 returns to step 810 at which point the next policy rule of the topology abstraction policy is selected. If a determination is made that the selected policy rule is the final topology rule of the topology abstraction policy, method 800 proceeds to step 850. At step 850, a determination is made as to whether a default policy rule exists for the topology abstraction policy. If a determination is made that a default policy rule exists for the topology abstraction policy, method 800 returns to step 820 (for additional processing to determine classification of the topology element based on the default policy rule, as discussed with respect to steps 820-840). If a determination is made that a default policy rule does not exist for the topology abstraction policy, method 800 proceeds to step 855 (at which point the topology element is classified as a REJECT topology element as a system default action based on a determination that the topology element does not satisfy any of the conditions of any of the policy rules of the topology abstraction policy) and then further proceeds to step 860. It will be appreciated that, although omitted from FIG. 8 for purposes of clarity, the assignment of the classification to the selected topology element (e.g., at one or more of step 830, step 835, step 840, or step 855) also may include one or more additional actions (e.g., assigning a label or identifier to the topology element or the like). At step 860, a determination is made as to whether the selected topology element is the final topology element to be evaluated based on the topology abstraction policy. If a determination is made that the selected topology element is not the final topology element to be evaluated based on the topology abstraction policy, the method 800 returns to step 805 at which point the next topology element to be evaluated is selected. If a determination is made that the selected topology element is the final topology element to be evaluated based on the topology abstraction policy, the method 800 proceeds to step 899 where method 800 ends. At step 899, method 800 ends. It will be appreciated that, although primarily depicted and described as ending (for purposes of clarity), method 800 may be repeated for multiple topology abstraction policies (e.g., where only a portion of the topology elements apply to the topology abstraction policy described with respect to method 800 and other topology elements may need to be classified according to other topology abstraction policies).

Figure 9:
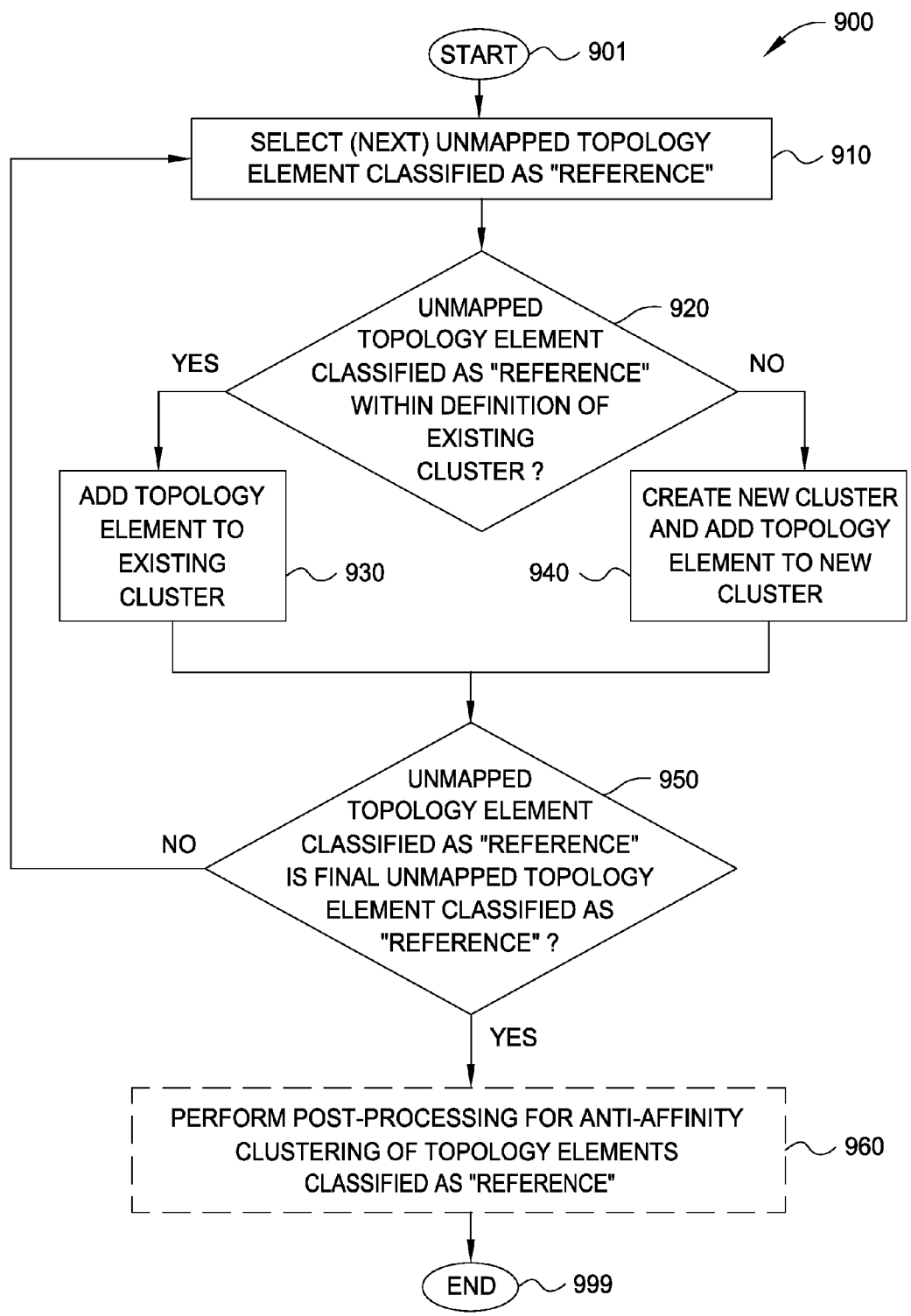
FIG. 9 depicts an exemplary embodiment of a method for performing anti-affinity clustering for topology elements classified based on topology abstraction policies.

FIG. 9 depicts an exemplary embodiment of a method for performing anti-affinity clustering for topology elements classified based on topology abstraction policies. It will be appreciated that, although primarily presented as being performed serially, at least a portion of the steps of method 900 may be performed contemporaneously or in a different order than as presented in FIG. 9. At step 901, method 900 begins. At step 910, a (next) unmapped topology element classified as REFERENCE is selected. At step 920, a determination is made as to whether the unmapped topology element classified as REFERENCE is within the definition of an existing cluster. This determination may be based on a given identifier definition (e.g., the topology element has an identifier of RESIDENTIAL, CACHE_A, CACHE_B, or CACHE_C), a given address definition, or the like, as well as various combinations thereof. If the unmapped topology element classified as REFERENCE is within the definition of an existing cluster, method 900 proceeds to step 930, at which point the topology element is added to the existing cluster. If the unmapped topology element classified as REFERENCE is not within the definition of an existing cluster, method 900 proceeds to step 940, at which point a new cluster is created for the topology element and the topology element is added to the newly created cluster. From steps 930 and 940, method 900 proceeds to step 950. At step 950, a determination is made as to whether the unmapped topology element classified as REFERENCE is the final unmapped topology element classified as REFERENCE. If the unmapped topology element classified as REFERENCE is not the final unmapped topology element classified as REFERENCE, method 900 returns to step 910, at which point a (next) unmapped topology element classified as REFERENCE is selected. If the unmapped topology element classified as REFERENCE is the final unmapped topology element classified as REFERENCE, method 900 proceeds to step 960 or, optionally, to step 999. At step 960 (an optional step, as indicated above), post-processing may be performed for the anti-affinity clustering of the topology elements. The post-processing may include processing on clusters including more than one topology element (e.g., using cluster-internal sparsification to sparsify clusters including multiple topology elements, or the like). At step 999, method 900 ends. An exemplary result of application of anti-affinity clustering for a communication network similar to that of the communication network 500 of FIG. 5 is depicted in FIG. 10.

Figure 10:
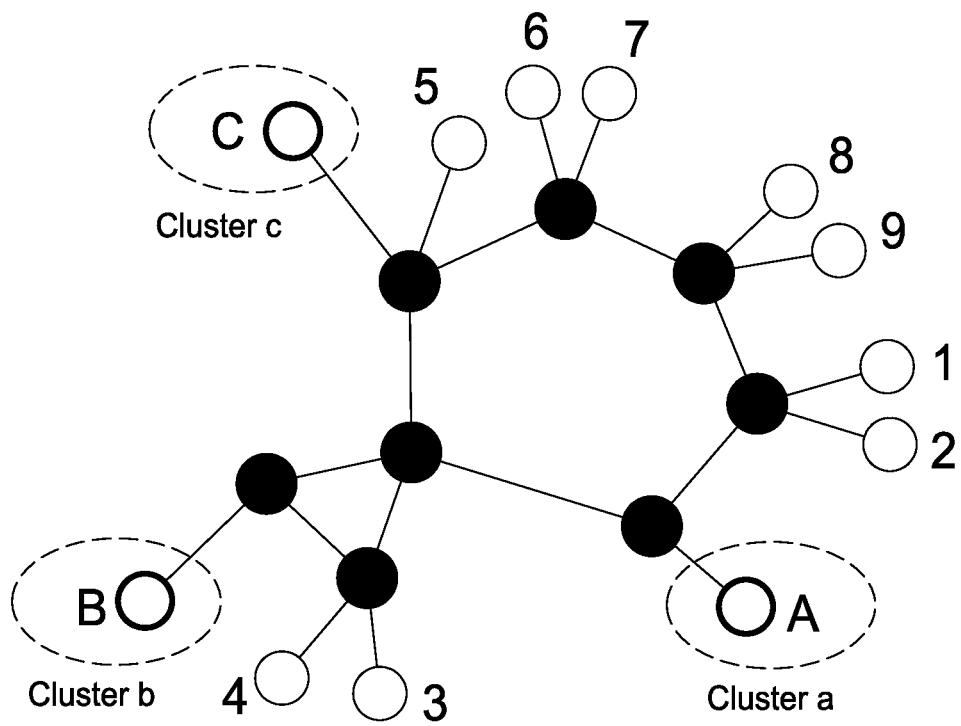
FIG. 10 depicts an exemplary application of the anti-affinity clustering of FIG. 9 to a communication network similar to the communication network of FIG. 5.

FIG. 10 depicts an exemplary application of the anti-affinity clustering of FIG. 9 to a communication network similar to the communication network of FIG. 5. As depicted in FIG. 10, similar to FIG. 5, the three topology elements classified as REFERENCE elements are assigned to three different clusters (e.g., CACHE_A assigned to CLUSTER A, CACHE_B assigned to CLUSTER B, CACHE_C assigned to CLUSTER C). The remaining topology elements are classified as ACCEPT and REJECT and, thus, are not clustered based on anti-affinity clustering. The exemplary application of anti-affinity clustering as depicted in FIG. 9 may be further understood by way of reference to exemplary communication network 500 depicted and described with respect to FIG. 5.

Figure 11:
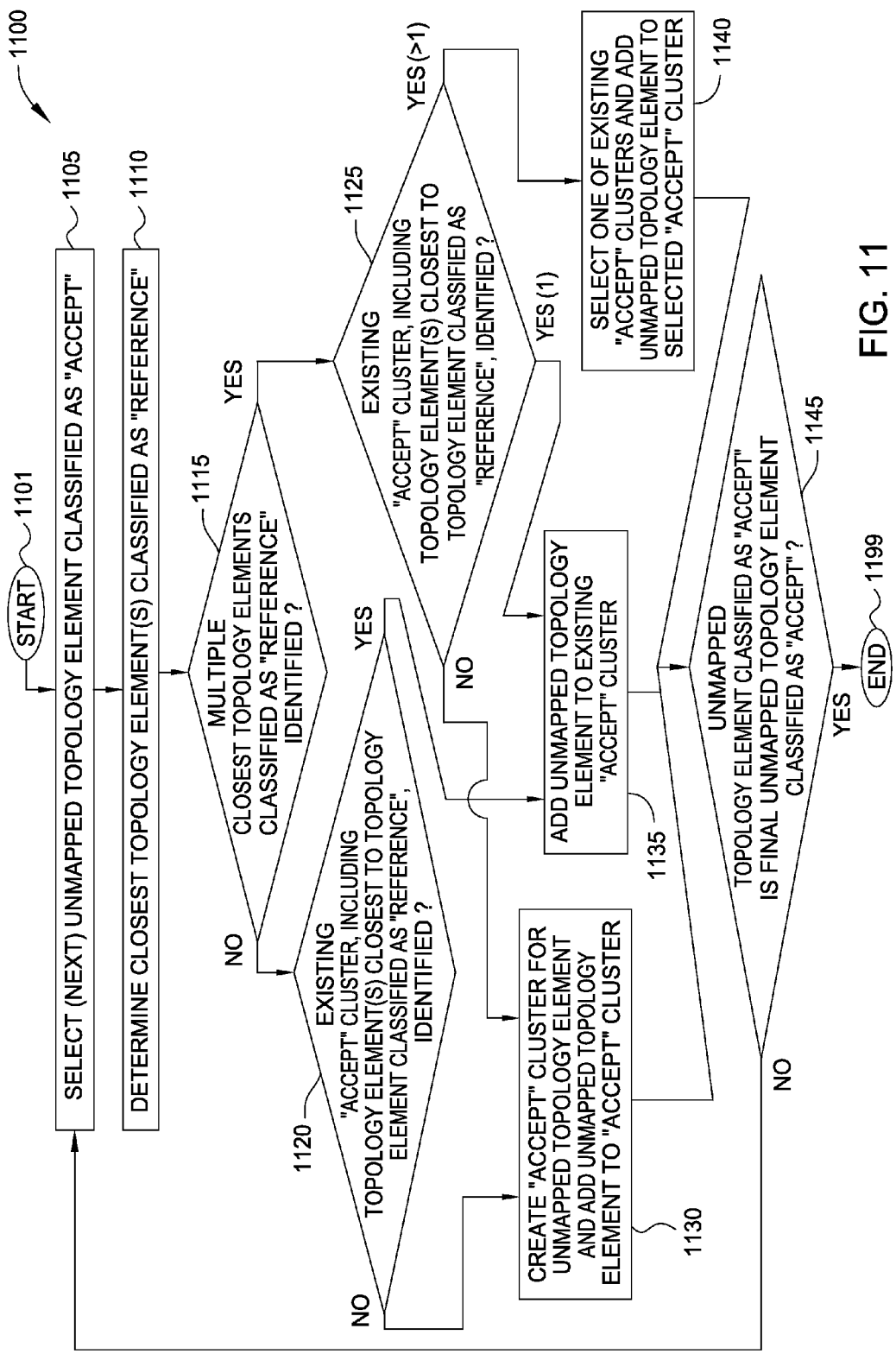
FIG. 11 depicts an exemplary embodiment of a method for performing affinity clustering for topology elements classified based on topology abstraction policies.

FIG. 11 depicts an exemplary embodiment of a method for performing affinity clustering for topology elements classified based on topology abstraction policies. It will be appreciated that, although primarily presented as being performed serially, at least a portion of the steps of method 1100 may be performed contemporaneously or in a different order than as presented in FIG. 11.

At step 1101, method 1100 begins.

At step 1105, an (next) unmapped topology element that is classified using the ACCEPT classification is selected.

At step 1110, the topology element(s) classified as REFERENCE that is closest to the unmapped topology element is determined. The determination of closeness between topology elements may be based on any suitable measure of topological distance. The determination of closeness may be based on cost information, which may be based on one or more of routing protocol metrics, one or more network characteristics (e.g., bandwidth, delay, or the like), geometrical distance, geographical distance, or the like, as well as various combinations thereof.

At step 1115, a determination is made as to whether multiple topology elements classified as REFERENCE are identified as being closest to the unmapped topology element. Here, multiple topology elements classified as REFERENCE may be identified as being closest to the unmapped topology element where the topological distance from the unmapped topology element to each of the multiple topology elements classified as REFERENCE is the same or at least within a threshold. If multiple topology elements classified as REFERENCE are not identified as being closest to the unmapped topology element (i.e., only a single topology element classified as REFERENCE is identified), method 1100 proceeds to step 1120. If multiple topology elements classified as REFERENCE are identified as being closest to the unmapped topology element, method 1100 proceeds to step 1125.

At step 1120, a determination is made as to whether an existing ACCEPT cluster, including one or more topology elements closest to the topology element classified as REFERENCE, is identified. If a determination is made that an existing ACCEPT cluster, including one or more topology elements closest to the topology element classified as REFERENCE, is not identified, method 1110 proceeds to step 1130 (at which point an ACCEPT cluster is created for the unmapped topology element and the unmapped topology element is added to the created ACCEPT cluster) and then further proceeds to step 1145. If a determination is made that an existing ACCEPT cluster, including one or more topology elements closest to the topology element classified as REFERENCE, is identified, method 1110 proceeds to step 1135 (at which point the unmapped topology element is added to the existing ACCEPT cluster) and then further proceeds to step 1145.

At step 1125, a determination is made as to whether an existing ACCEPT cluster, including one or more topology elements closest to the topology element classified as REFERENCE, is identified. If a determination is made that an existing ACCEPT cluster, including one or more topology elements closest to the topology element classified as REFERENCE, is not identified, method 1110 proceeds to step 1130 (at which point an ACCEPT cluster is created for the unmapped topology element and the unmapped topology element is added to the created ACCEPT cluster) and then further proceeds to step 1145. If a determination is made that an existing ACCEPT cluster, including a single topology element closest to the topology element classified as REFERENCE, is identified, method 1110 proceeds to step 1135 (at which point the unmapped topology element is added to the existing ACCEPT cluster) and then further proceeds to step 1145. If a determination is made that an existing ACCEPT cluster, including multiple topology elements closest to the topology element classified as REFERENCE, is identified, method 1110 proceeds to step 1140 (at which point one of the existing ACCEPT clusters is selected and the unmapped topology element is added to the selected one of the existing ACCEPT clusters) and then further proceeds to step 1145.

At step 1145, a determination is made as to whether the unmapped topology element classified as ACCEPT is the final unmapped topology element classified as ACCEPT. If the unmapped topology element classified as ACCEPT is not the final unmapped topology element classified as ACCEPT, method 1100 returns to step 1105, at which point a (next) unmapped topology element classified as ACCEPT is selected. If the unmapped topology element classified as ACCEPT is the final unmapped topology element classified as ACCEPT, method 1100 proceeds to step 1199.

At step 1199, method 1100 ends. An exemplary result of application of affinity clustering based on method 1100, for a communication network similar to the communication network 500 of FIG. 5, is depicted in FIG. 12.

Figure 12:
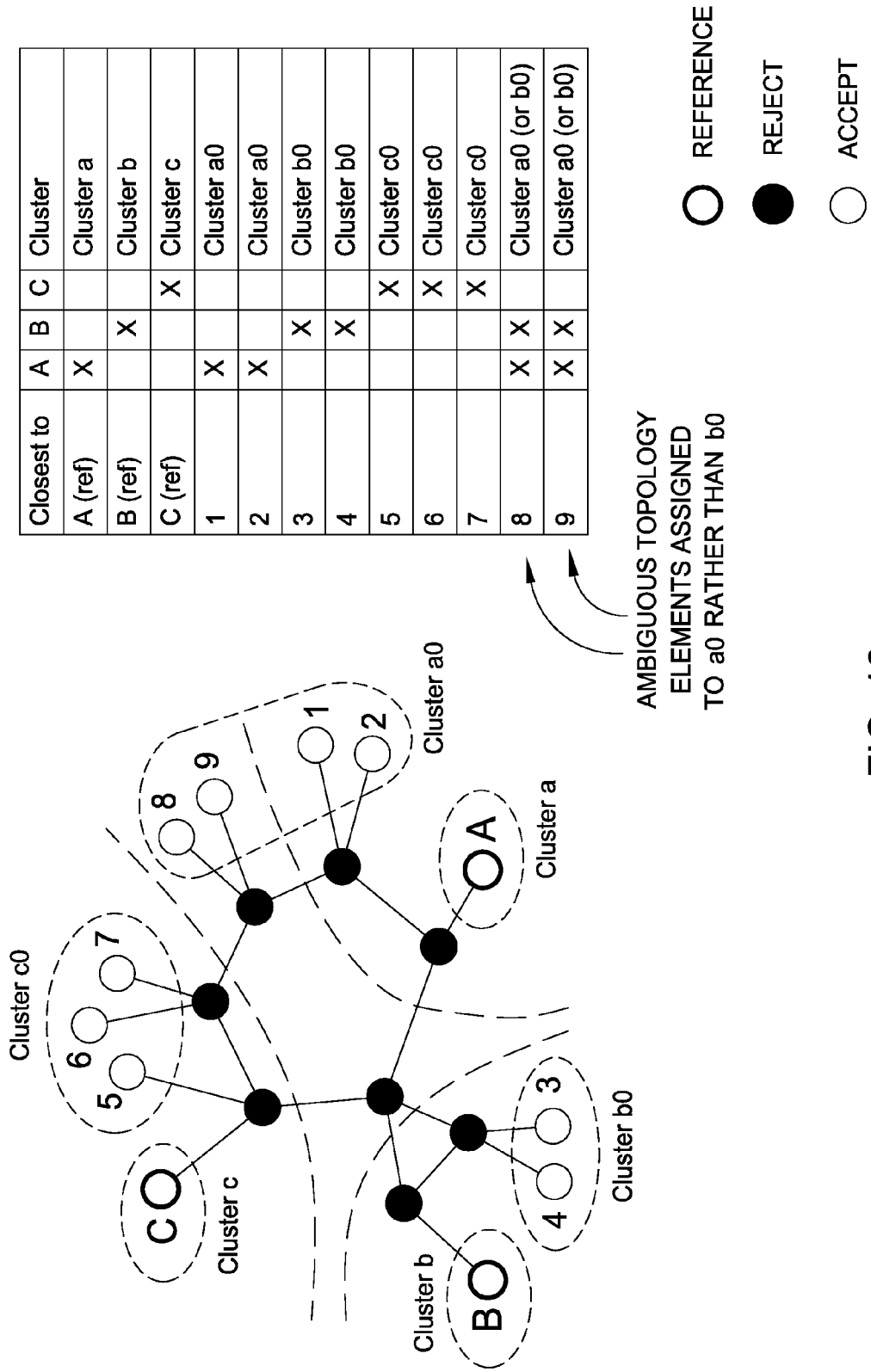
FIG. 12 depicts an exemplary application of the affinity clustering of FIG. 11 to a communication network similar to the communication network of FIG. 5.

FIG. 12 depicts an exemplary application of the affinity clustering of FIG. 11 to a communication network similar to the communication network of FIG. 5. As depicted in FIG. 12, the three topology elements classified as REFERENCE elements have already been clustered using anti-affinity clusters (e.g., as depicted and described with respect to FIG. 9 and FIG. 10). As further depicted in FIG. 12, similar to FIG. 5, topologically close topology elements classified as ACCEPT are grouped into clusters. For example, topology elements 1 and 2 are determined to be topologically closest to Cache A (or Cluster A including Cache A) and, thus, are grouped into Cluster a0. For example, topology elements 3 and 4 are determined to be topologically closest to Cache B (or Cluster B including Cache B) and, thus, are grouped into Cluster b0. For example, topology elements 5, 6, and 7 are determined to be topologically closest to Cache C (or Cluster C including Cache C) and, thus, are grouped into Cluster c0. For example, topology elements 8 and 9 are determined to be topologically closest to both Cache A and Cache B (or Cluster A and Cluster) and, thus, may be grouped into Cluster a0 associated with Cache A or Cluster b0 associated with Cache B (illustratively, they are clustered into Cluster a0). Here, topology elements 8 and 9 illustrate one embodiment of a method for handling the ambiguous case in which an ACCEPT topology element is topologically closest to multiple REFERENCE topology elements (as discussed with respect to method 1100 of FIG. 11, by selecting one of the multiple topologically closest clusters). The exemplary application of affinity clustering as depicted in FIG. 12 may be further understood by way of reference to exemplary communication network 500 depicted and described with respect to FIG. 5.

Figure 13:
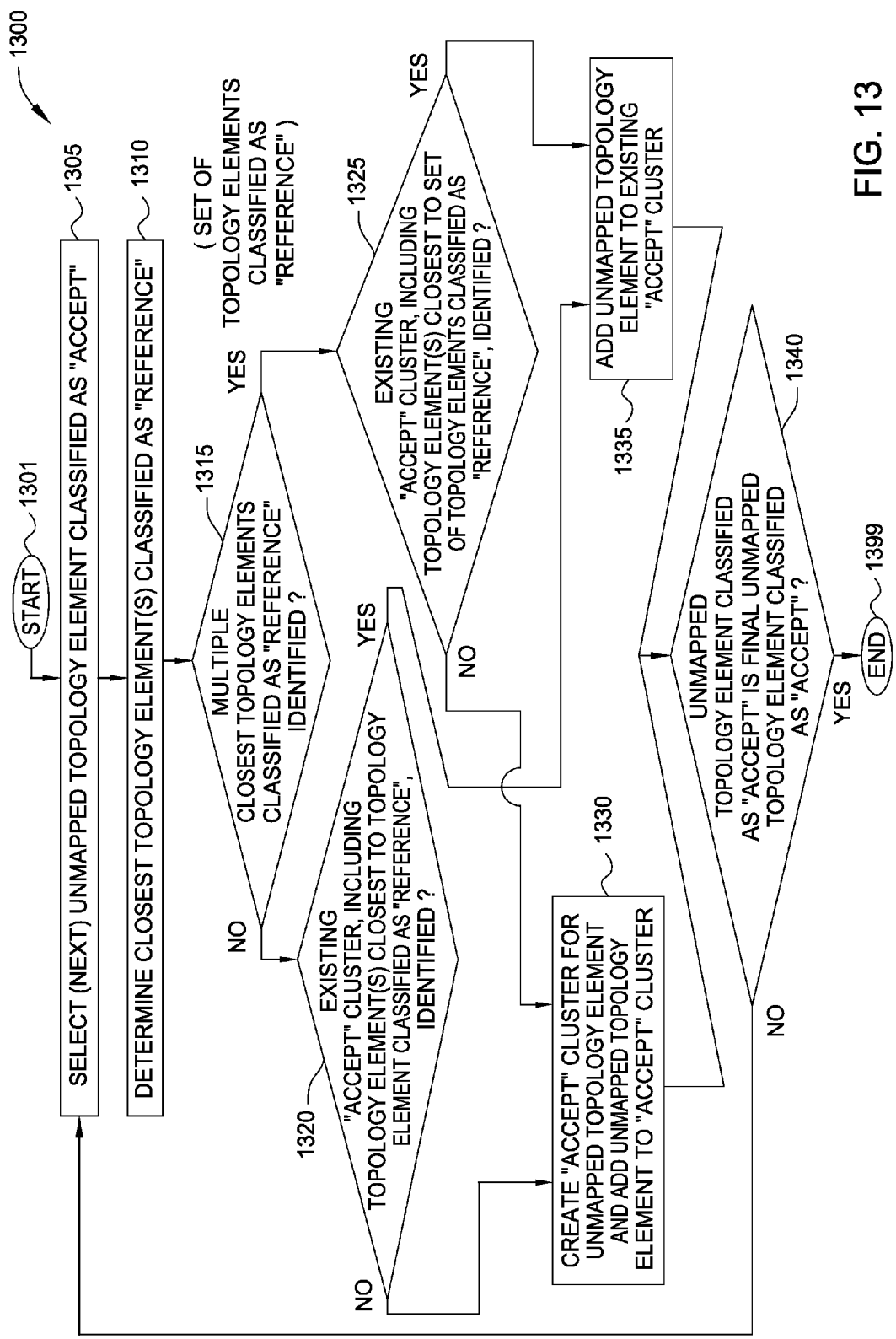
FIG. 13 depicts an exemplary embodiment of a method for performing affinity clustering for topology elements classified based on topology abstraction policies.

FIG. 13 depicts an exemplary embodiment of a method for performing affinity clustering for topology elements classified based on topology abstraction policies. It will be appreciated that, although primarily presented as being performed serially, at least a portion of the steps of method 1300 may be performed contemporaneously or in a different order than as presented in FIG. 13.

At step 1301, method 1300 begins.

At step 1305, an (next) unmapped topology element that is classified using the ACCEPT classification is selected.

At step 1310, the topology element(s) classified as REFERENCE that is closest to the unmapped topology element is determined. The determination of closeness between topology elements may be based on any suitable measure of topological distance. The determination of closeness may be based on cost information, which may be based on one or more of routing protocol metrics, one or more network characteristics (e.g., bandwidth, delay, or the like), geometrical distance, geographical distance, or the like, as well as various combinations thereof.

At step 1315, a determination is made as to whether multiple topology elements classified as REFERENCE are identified as being closest to the unmapped topology element. Here, multiple topology elements classified as REFERENCE may be identified as being closest to the unmapped topology element where the topological distance from the unmapped topology element to each of the multiple topology elements classified as REFERENCE is the same or at least within a threshold. If multiple topology elements classified as REFERENCE are not identified as being closest to the unmapped topology element (i.e., only a single topology element classified as REFERENCE is identified), method 1300 proceeds to step 1320. If multiple topology elements classified as REFERENCE are identified as being closest to the unmapped topology element (where, as discussed further below, the multiple topology elements classified as REFERENCE will be considered as a set), method 1300 proceeds to step 1325.

At step 1320, a determination is made as to whether an existing ACCEPT cluster, including one or more topology elements closest to the topology element classified as REFERENCE, is identified. If a determination is made that an existing ACCEPT cluster, including one or more topology elements closest to the topology element classified as REFERENCE, is not identified, method 1310 proceeds to step 1330 (at which point an ACCEPT cluster is created for the unmapped topology element and the unmapped topology element is added to the created ACCEPT cluster) and then further proceeds to step 1340. If a determination is made that an existing ACCEPT cluster, including one or more topology elements closest to the topology element classified as REFERENCE, is identified, method 1310 proceeds to step 1335 (at which point the unmapped topology element is added to the existing ACCEPT cluster) and then further proceeds to step 1340.

At step 1325, a determination is made as to whether an existing ACCEPT cluster, including one or more topology elements closest to the set of topology elements classified as REFERENCE, is identified. If a determination is made that an existing ACCEPT cluster, including one or more topology elements closest to the set of topology element classified as REFERENCE, is not identified, method 1310 proceeds to step 1330 (at which point an ACCEPT cluster is created for the unmapped topology element and the unmapped topology element is added to the created ACCEPT cluster) and then further proceeds to step 1340. If a determination is made that an existing ACCEPT cluster, including one or more topology elements closest to the set of topology elements classified as REFERENCE, is identified, method 1310 proceeds to step 1335 (at which point the unmapped topology element is added to the existing ACCEPT cluster associated with the set of topology elements classified as REFERENCE) and then further proceeds to step 1340.

At step 1340, a determination is made as to whether the unmapped topology element classified as ACCEPT is the final unmapped topology element classified as ACCEPT. If the unmapped topology element classified as ACCEPT is not the final unmapped topology element classified as ACCEPT, method 1300 returns to step 1305, at which point a (next) unmapped topology element classified as ACCEPT is selected. If the unmapped topology element classified as ACCEPT is the final unmapped topology element classified as ACCEPT, method 1300 proceeds to step 1399.

At step 1399, method 1300 ends. An exemplary result of application of affinity clustering based on method 1300, for a communication network similar to the communication network 500 of FIG. 5, is depicted in FIG. 14.

Figure 14:
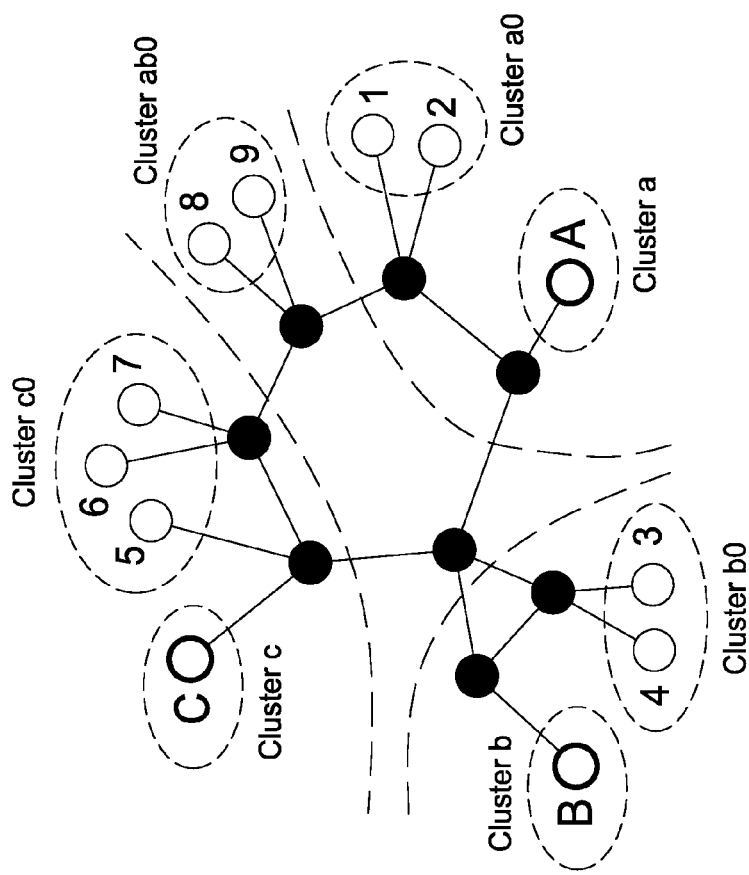
FIG. 14 depicts an exemplary application of the affinity clustering of FIG. 13 to a communication network similar to the communication network of FIG. 5.

FIG. 14 depicts an exemplary application of the affinity clustering of FIG. 13 to a communication network similar to the communication network of FIG. 5. As depicted in FIG. 14, the three topology elements classified as REFERENCE elements have already been clustered using anti-affinity clusters (e.g., as depicted and described with respect to FIG. 9 and FIG. 10). As further depicted in FIG. 14, similar to FIG. 5, topologically close topology elements classified as ACCEPT are grouped into clusters. For example, topology elements 1 and 2 are determined to be topologically closest to Cache A (or Cluster A including Cache A) and, thus, are grouped into Cluster a0. For example, topology elements 3 and 4 are determined to be topologically closest to Cache B (or Cluster B including Cache B) and, thus, are grouped into Cluster b0. For example, topology elements 5, 6, and 7 are determined to be topologically closest to Cache C (or Cluster C including Cache C) and, thus, are grouped into Cluster c0. For example, topology elements 8 and 9 are determined to be topologically closest to both Cache A and Cache B (or Cluster A and Cluster) and, thus, have been grouped into a new cluster (illustratively, Cluster ab0), rather than being grouped into Cluster a0 or Cluster b0, in order to resolve any potential ambiguity regarding the correct cluster for topology elements 8 and 9. Here, topology elements 8 and 9 illustrate one embodiment of a method for handling the ambiguous case in which an ACCEPT topology element is topologically closest to multiple REFERENCE topology elements (as discussed with respect to method 1300 of FIG. 13, by creating a new ACCEPT cluster rather than selecting one of the multiple topologically closest clusters). The exemplary application of affinity clustering as depicted in FIG. 14 may be further understood by way of reference to exemplary communication network 500 depicted and described with respect to FIG. 5.

Various embodiments of the capability for providing policy enforcement in a topology abstraction system may provide various advantages, at least some of which have been discussed or otherwise indicated above. In at least some embodiments, the capability for providing policy enforcement in a topology abstraction system may provide an integrated policy and node clustering solution that enables relatively simple configuration adapted to typical use cases of a topology manager. In at least some embodiments, the capability for providing policy enforcement in a topology abstraction system may support automated abstraction of network topology information by automatically aggregating those parts of the network topology that do not matter for a given user of the topology exposure system, thereby reducing the size of maps and addressing privacy concerns of network operators. In at least some embodiments, the capability for providing policy enforcement in a topology abstraction system may prevent parts of the network that are important (e.g., important to a given user of a topology exposure system using output of the topology abstraction system) from being clustered into clusters in a way that prevents differentiation between the important parts of the network (e.g., where the given user of the topology exposure system is managing a CDN, preventing the given user of the topology exposure system from being unable to distinguish between different CDN caches). In at least some embodiments, the capability for providing policy enforcement in a topology abstraction system may enable a network operator to be aware of portions of the network topology of the network operator that are being exposed to users of a topology exposure system, thus preventing unwanted leakage of information via the topology exposure system and, as a result, improving the security of the topology exposure system). Various embodiments of the providing policy enforcement in a topology abstraction system may provide various other advantages.

Various embodiments are configured to support use of one or more policies to abstract a network topology. Various embodiments are configured to support explicit labeling of sets of addresses of a network topology, use of such labeling of sets of addresses for classification of the sets of addresses, and use of the classification of the sets of addresses for controlling abstraction of the network topology. Various embodiments are configured to provide a policy description system for topology abstraction that allows labeling of certain sets of addresses (or other topology elements or groups of topology elements) as reference points, thereby (1) ensuring that a unique separation and identification of those sets of addresses after abstraction is possible and (2) enabling topology aggregation principles that require labeled data as input. Various embodiments are configured to use labeling during a classification process in order to distinguish portions of the topology that are processed by anti-affinity clustering from portions that are processed by affinity clustering. Various embodiments are configured to support filter rules that explicitly remove sets of addresses (or other topology elements or groups of topology elements) from the calculated abstract topology, where the filter rules can operate set of IP addresses or other meta-data characterizing properties of the addresses (or information characterizing various properties of other topology elements or groups of topology elements). Various embodiments are configured to support a capability for determining addresses or topology elements that should be hidden and not exposed by the system to external users. Various embodiments are configured to support a capability for determining clustering in a topology abstraction system by explicitly marking a set of addresses or address-related routing properties in an abstraction policy description. Various embodiments are configured to support a capability for classifying addresses or topology elements that should be kept separate from other addresses or topology elements (anti-affinity clustering) and addresses or topology elements that should be visible but can possibly be aggregated (affinity clustering). Various embodiments are configured to support acceptance/rejection (selection/filtering) and, optionally, clustering of topology elements where the topology elements are defined based on addresses and, further, where the addresses are defined by one or more of IP addresses, IP subnet ranges, or other data which may be used to characterize properties of the IP address or its origin (e.g., the originating routing protocol, BGP parameters such as AS numbers or community values, functions or pattern matches to such parameters, and so forth), or the like, as well as various combinations thereof. Various embodiments are configured to support determination of clusters where the clusters correspond to ALTO PIDs and the abstraction results are exposed by the ALTO protocol. Various embodiments are configured to support use of policy specifications that include explicit setting of the name of ALTO PIDs. Various combinations of such embodiments may be provided.

It will be appreciated that, although primarily depicted and described herein with respect to embodiments in which network topology abstraction is performed using both anti-affinity clustering and affinity clustering, in at least some embodiments network topology abstraction may be performed using only anti-affinity clustering or without explicitly performing any clustering. For example, while use of affinity clustering may be useful in certain relatively large networks (e.g., networks having many residential users in different IP subnets), use of affinity clustering may be not that useful in other situations (e.g., relatively small networks, networks where the data source already provides a relatively highly aggregated view of the network (e.g., large IP subnets), and so forth). In at least some embodiments, for example, affinity clustering is not used. In at least some embodiments, for example, affinity clustering may or may not be used depending on one or more factors (e.g., network size, resources available for representing the network topology, or the like, as well as various combinations thereof). In at least some embodiments, for example, the use of affinity clustering may depend on whether a threshold for the allowable number of clusters or allowable number of ACCEPT clusters has been satisfied (e.g., if 100 ACCEPT clusters are allowed and there are 200 topology elements classified as ACCEPT, then the first 100 topology elements classified as ACCEPT may be grouped into 100 ACCEPT clusters and the remaining 100 topology elements classified as ACCEPT may be grouped into those 100 existing ACCEPT clusters. In at least some embodiments, for example, topology element abstraction information (and, thus, topology abstraction information) could be created by simply accepting topology elements classified as ACCEPT for inclusion within the topology element abstraction information and filtering topology elements classified as REJECT from inclusion within the topology element abstraction information; here, anti-affinity clustering may be actively applied to the topology elements classified as ACCEPT in order to ensure that the topology elements classified as ACCEPT are represented as separate elements within topology element abstraction information, or the topology elements classified as ACCEPT may simply be included as separate elements within topology element abstraction information (e.g., anti-affinity clustering is inherent as each of the topology elements classified as ACCEPT is represented separately, such that each of the topology elements classified as ACCEPT may be considered to form its own cluster).

It will be appreciated that, although primarily depicted and described herein with respect to providing policy enforcement for topology abstraction within the context of a specific topology exposure capability configured to expose network topology information of a communication network (namely, ALTO), various embodiments depicted and described herein may be applied or adapted for providing policy enforcement for various other types of topology exposure capabilities.

It will be appreciated that, although primarily depicted and described herein with respect to providing policy enforcement for topology abstraction within the context of a topology exposure system configured to expose network topology information of the communication network, various embodiments depicted and described herein may be applied or adapted for providing policy enforcement for topology abstraction within various other contexts. For example, various embodiments depicted and described herein may be applied or adapted for providing policy enforcement for topology abstraction within the context of network or service provisioning, network fault management, or the like, as well as various combinations thereof. For example, various embodiments depicted and described herein may be applied or adapted for providing policy enforcement for topology abstraction for use with Internet Engineering Task Force (IETF) Interface to the Routing System (I2RS). For example, various embodiments depicted and described herein may be applied or adapted for providing policy enforcement for topology abstraction for use with IETF BGP-LS (also titled as North-Bound Distribution of Link-State and TE Information using BGP). For example, various embodiments depicted and described herein may be applied or adapted for providing policy enforcement for topology abstraction for use with Path Computation Elements (PCEs). For example, various embodiments depicted and described herein may be applied or adapted for providing policy enforcement for topology abstraction for use with Northbound Interfaces (NBIs) of SDN architectures. Various embodiments depicted and described herein may be applied or adapted for providing policy enforcement for topology abstraction for use in various other contexts.

It will be appreciated that, although primarily depicted and described herein with respect to providing policy enforcement for topology abstraction within the context of a communication network, various embodiments depicted and described herein may be applied or adapted for providing policy enforcement for topology abstraction in various other types of environments.

Figure 15:
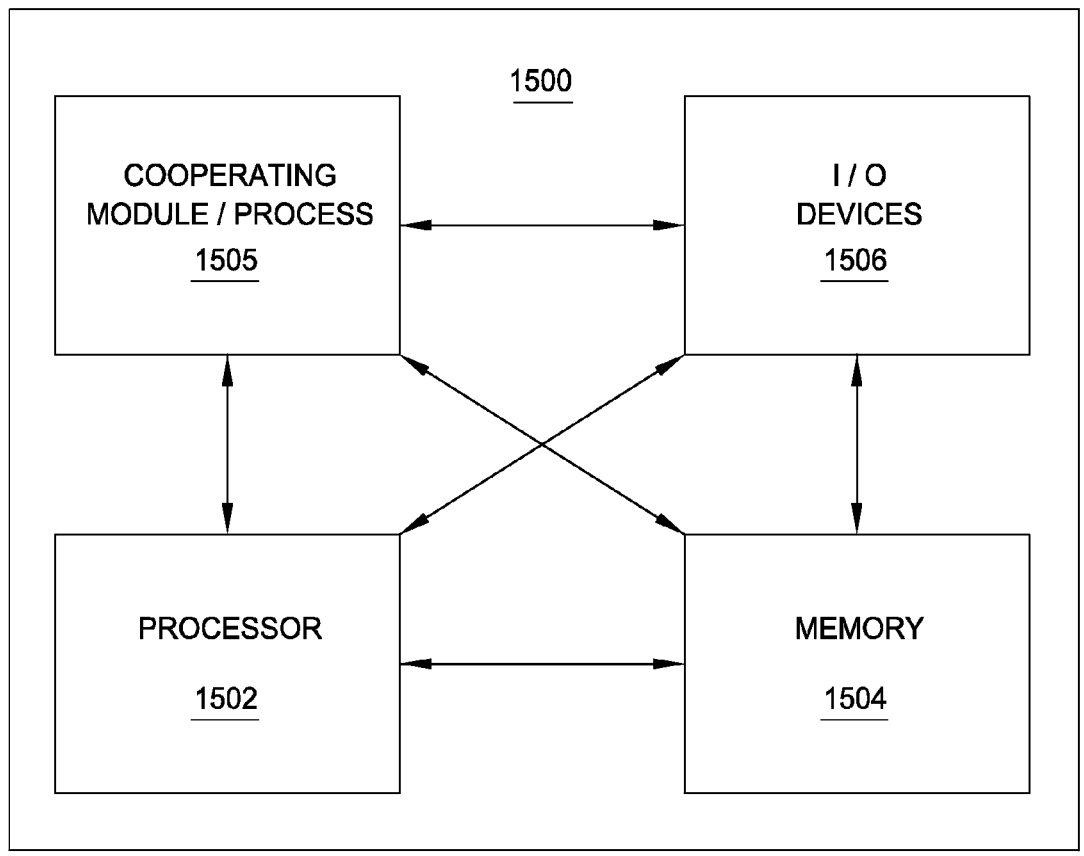
FIG. 15 depicts a high-level block diagram of a computer suitable for use in performing functions described herein.

FIG. 15 depicts a high-level block diagram of a computer suitable for use in performing functions described herein.

The computer 1500 includes a processor 1502 (e.g., a central processing unit (CPU) and/or other suitable processor(s)) and a memory 1504 (e.g., random access memory (RAM), read only memory (ROM), and the like).

The computer 1500 also may include a cooperating module/process 1505. The cooperating process 1505 can be loaded into memory 1504 and executed by the processor 1502 to implement functions as discussed herein and, thus, cooperating process 1505 (including associated data structures) can be stored on a computer readable storage medium, e.g., RAM memory, magnetic or optical drive or diskette, and the like.

The computer 1500 also may include one or more input/output devices 1506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1500 depicted in FIG. 15 provides a general architecture and functionality suitable for implementing functional elements described herein and/or portions of functional elements described herein. For example, computer 1500 provides a general architecture and functionality that may be suitable for implementing one or more of a node of communication network 110, topology manager 120, topology server 130, a topology client 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a processor and a memory communicatively connected to the processor, the processor configured to:
    receive topology information describing a set of topology elements of a topology;
    determine, based on a set of topology abstraction policies configured to control abstraction of the topology information describing the set of topology elements of the topology, topology element abstraction information, wherein, to determine the topology element abstraction information, the processor is configured to assign respective classifications to the topology elements in the set of topology elements based on the set of topology abstraction policies;
    determine, based on the topology element abstraction information, abstracted topology information configured to provide an abstract representation of the topology, wherein, to determine the abstracted topology information, the processor is configured to: determine, for each of the topology elements of the set of topology elements based on the respective classifications of the topology elements, whether to select the topology element for inclusion in the abstracted topology information; and
    determine based on the respective classifications of the topology elements selected for inclusion in the abstracted topology information, topology element clustering information indicative of clustering of the topology elements selected for inclusion in the abstracted topology information; and
    propagate the abstracted topology information toward a topology exposure element.

2. The apparatus of claim 1, wherein the set of topology elements comprises at least one of a node, a group of nodes, a communication link, or a group of communication links.

3. The apparatus of claim 1, wherein, for at least one of the topology elements, the topology information comprises at least one of an address of the topology element, a group of addresses with which the topology element is associated, Autonomous System (AS) description information associated with the topology element, identification of a source of topology information for the topology element, identification of a routing protocol providing topology information for the topology element, one or more protocol parameters of a routing protocol providing topology information for the topology element, or metadata.

4. The apparatus of claim 1, wherein, to assign the respective classifications to the topology elements, the processor is configured to:
    iteratively evaluate the topology elements with respect to the topology abstraction policies.

5. The apparatus of claim 1, wherein, to assign the respective classifications to the topology elements, the processor is configured to:
    select one of the topology elements from topology element information determined from the topology information;
    identify, from the set of topology abstraction policies, one of the topology abstraction policies with which the one of the topology elements is associated; and
    assign the respective classification to the one of the topology elements based on evaluation of one or more policy rules of the one of the topology abstraction policies with which the one of the topology elements is associated.

6. The apparatus of claim 5, wherein, to identify the one of the topology abstraction policies with which the one of the topology elements is associated, the processor is configured to:
    compare topology element description information for the one of the topology elements with respective policy definition information of one or more of the topology abstraction policies.

7. The apparatus of claim 5, wherein, to assign the respective classification to the one of the topology elements based on evaluation of one or more policy rules of the one of the topology abstraction policies with which the one of the topology elements is associated, the processor is configured to:
    identify one of the policy rules, of the one of the topology abstraction policies, having a condition satisfied by the one of the topology elements; and
    assign the respective classification to the one of the topology elements based on an action associated with the one of the policy rules, of the one of the topology abstraction policies, having the condition satisfied by the one of the topology elements.

8. The apparatus of claim 1, wherein the processor is configured to:
determine the abstract representation of the topology based on the abstracted topology information.

9. The apparatus of claim 1, wherein the processor is configured to:
determine the abstract representation of the topology based on the topology element clustering information indicative of the clustering of the topology elements selected for inclusion in the abstracted topology information.

10. The apparatus of claim 1, wherein the clustering comprises at least one of anti-affinity clustering or affinity clustering.

11. The apparatus of claim 1, wherein the processor is configured to:
perform a first type of clustering for ones of the topology elements selected for inclusion in the abstracted topology information that have a first classification associated therewith; and
perform a second type of clustering for ones of the topology elements selected for inclusion in the abstracted topology information that have a second classification associated therewith.

12. The apparatus of claim 11, wherein the first type of clustering comprises anti-affinity clustering and the second type of clustering comprises affinity clustering.

13. The apparatus of claim 1, wherein the processor is configured to:
assign a label to one of the topology elements selected for inclusion in the abstracted topology information.

14. The apparatus of claim 13, wherein the processor is configured to assign the label to the one of the topology elements based on one of the topology abstraction policies with which the one of the topology elements is associated.

15. The apparatus of claim 13, wherein the processor is configured to:
derive an identifier for the one of the topology elements, based on the label, for use in the abstract representation of the topology.

16. The apparatus of claim 1, wherein the processor is configured to:
determine the clustering of the topology elements selected for inclusion in the abstracted topology information.

17. The apparatus of claim 16, wherein, to determine the clustering of the topology elements, the processor is configured to:
apply anti-affinity clustering to portions of the topology elements selected for inclusion in the abstracted topology information; and
apply affinity clustering to portions of the topology elements selected for inclusion in the abstracted topology information.

18. A method, comprising:
receiving, by a processor, topology information describing a set of topology elements of a topology;
determining, by the processor based on a set of topology abstraction policies configured to control abstraction of the topology information describing the set of topology elements of the topology, topology element abstraction information, wherein determining the topology element abstraction information comprises assigning respective classifications to the topology elements in the set of topology elements based on the set of topology abstraction policies;
determining, by the processor based on the topology element abstraction information, abstracted topology information configured to provide an abstract representation of the topology, wherein determining the abstracted topology information comprises determining, for each of the topology elements of the set of topology elements based on the respective classifications of the topology elements, whether to select the topology element for inclusion in the abstracted topology information; and
determining, based on the respective classifications of the topology elements selected for inclusion in the abstracted topology information, topology element clustering information indicative of clustering of the topology elements selected for inclusion in the abstracted topology information; and
propagating, by the processor, the abstracted topology information toward a topology exposure element.

19. A non-transitory computer-readable storage medium storing instructions which, when executed by a computer, cause the computer to perform a method, the method comprising:
receiving topology information describing a set of topology elements of a topology;
determining, based on a set of topology abstraction policies configured to control abstraction of the topology information describing the set of topology elements of the topology, topology element abstraction information, wherein determining the topology element abstraction information comprises assigning respective classifications to the topology elements in the set of topology elements based on the set of topology abstraction policies;
determining, based on the topology element abstraction information, abstracted topology information configured to provide an abstract representation of the topology, wherein determining the abstracted topology information comprises determining, for each of the topology elements of the set of topology elements based on the respective classifications of the topology elements, whether to select the topology element for inclusion in the abstracted topology information; and
determining, based on the respective classifications of the topology elements selected for inclusion in the abstracted topology information, topology element clustering information indicative of clustering of the topology elements selected for inclusion in the abstracted topology information; and
propagating the abstracted topology information toward a topology exposure element.

* * * * *